United States Patent
Zhu et al.

(10) Patent No.: US 9,825,716 B2
(45) Date of Patent: Nov. 21, 2017

(54) METHODS AND APPARATUS FOR ANTENNA CALIBRATION

(71) Applicant: Telefonaktiebolaget L M Ericsson (publ), Stockholm (SE)

(72) Inventors: Huaisong Zhu, Beijing (CN); Shaowei Yu, Beijing (CN); Zhiyi Zong, Beijing (CN); Yang Tian, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/038,581

(22) PCT Filed: Dec. 11, 2013

(86) PCT No.: PCT/CN2013/089065
§ 371 (c)(1),
(2) Date: May 23, 2016

(87) PCT Pub. No.: WO2015/085510
PCT Pub. Date: Jun. 18, 2015

(65) Prior Publication Data
US 2016/0301484 A1 Oct. 13, 2016

(51) Int. Cl.
*H04M 1/00* (2006.01)
*H04B 17/14* (2015.01)
(Continued)

(52) U.S. Cl.
CPC .......... *H04B 17/14* (2015.01); *H04B 7/024* (2013.01); *H04L 27/34* (2013.01); *H04W 88/08* (2013.01); *H04B 7/04* (2013.01)

(58) Field of Classification Search
CPC ... H04L 5/0048; H04L 5/0023; H04L 5/0007; H04L 27/2602; H04L 5/0053;
(Continued)

(56) References Cited

U.S. PATENT DOCUMENTS

| 2010/0075594 A1 | 3/2010 | Kim et al. | |
| 2012/0020396 A1* | 1/2012 | Hohne | H01Q 3/267 375/224 |
| 2012/0220331 A1* | 8/2012 | Luo | H04B 17/14 455/517 |

FOREIGN PATENT DOCUMENTS

| CN | 102148636 A | 8/2011 |
| CN | 102149123 A | 8/2011 |

(Continued)

OTHER PUBLICATIONS

International Search Report and Written Opinion for International Patent Application No. PCT/CN2013/089065, dated Sep. 17, 2014, 12 pages.

*Primary Examiner* — Golam Sorowar
(74) *Attorney, Agent, or Firm* — Withrow & Terranova, PLLC

(57) ABSTRACT

The present disclosure provides a method in a base station of a radio network for antenna calibration of a first transceiver of the base station with respect to a second transceiver. The method comprises at least one of a first group and a second group of steps. The first group of steps comprises collecting a first group of amplitude and phase differences between a first calibration signal and each of a first and a fourth reception signals and between a second calibration signal and each of a second and a third reception signals. The first group of steps further comprises estimating, based on the first group of amplitude and phase differences, a signal response characteristic difference between a calibration reception chain of the first transceiver and a calibration reception chain of the second transceiver for reference antenna reception calibration of the first transceiver with respect to the second transceiver.

12 Claims, 14 Drawing Sheets

(51) Int. Cl.
*H04B 7/024* (2017.01)
*H04L 27/34* (2006.01)
*H04W 88/08* (2009.01)
*H04B 7/04* (2017.01)

(58) Field of Classification Search
CPC ............. H04L 25/0204; H04L 25/0224; H04L 27/2613; H04L 1/0026; H04L 1/0025; H04L 1/0057; H04L 1/0061; H04L 25/0226; H04L 27/2647; H04L 5/0032; H04L 5/0044; H04B 7/0617; H04B 7/0697; H04B 7/0417; H04B 7/0691; H04B 17/309; H04B 7/0632; H04B 7/0689; H04B 17/345; H04B 1/1036; H04B 7/022; H04B 7/024; H04B 7/04; H04B 7/063; H04B 15/00; H04B 17/318; H04W 24/02; H04W 24/10; H04W 72/02; H04W 24/08; H04W 72/082; H04W 88/02; H04W 88/08; H04W 24/00; H04W 24/06; H04W 72/0413; H04W 72/042; H04W 72/0453; H04W 72/085; H04W 28/04; H04W 28/048; H04W 28/20; H04W 52/243

See application file for complete search history.

(56) References Cited

FOREIGN PATENT DOCUMENTS

| | | |
|---|---|---|
| CN | 102195695 A | 9/2011 |
| CN | 102843173 A | 12/2012 |
| CN | 103229354 A | 7/2013 |
| WO | 2011047497 A1 | 4/2011 |
| WO | 2013056398 A1 | 4/2013 |

* cited by examiner

US 9,825,716 B2

METHODS AND APPARATUS FOR ANTENNA CALIBRATION

This application is a 35 U.S.C. §371 national phase filing of International Application No. PCT/CN2013/089065, filed December 11, 2013, the disclosure of which is incorporated herein by reference in its entirety.

TECHNICAL FIELD

The present disclosure generally relates to the technical field of antenna calibration, and particularly, to methods and apparatus for antenna calibration of a transceiver with respect to another transceiver.

BACKGROUND

Multi-antenna technology, which allows for simultaneous transmission/reception of wireless signals at a transceiver, is widely used in the $3^{rd}$ Generation (3G) and Long Term Evolution (LTE) communication systems. To make a full use of the advantages of multi-antenna transceivers, it is required that transmission/reception chains of such a multi-antenna transceiver have the same signal response characteristic (including phase rotation characteristic and amplitude scaling characteristic). To satisfy this requirement, the so-called intra-transceiver antenna calibration process must be performed, whereby differences in phase rotation and amplitude scaling among the transmission/reception chains can be compensated for.

FIG. 1 illustrates an exemplary multi-antenna transceiver 10 according to the prior art, wherein an antenna array 110, a radio unit 120 and a Base Band Unit (BBU) 130 are provided. The antenna array 110 comprises four antenna elements. The radio unit 120 comprises four pairs of transmission (TX) chains $11_1$, $11_2$, $11_3$ and $11_4$ and reception (RX) chains $12_1$, $12_2$, $12_3$ and $12_4$ as well as a pair of a calibration transmission chain $11_c$ and a calibration reception chain $12_c$.

Each of the transmission chains $11_1$, $11_2$, $11_3$ and $11_4$ refers to a respective signal transmission path from the BBU 130 to the antenna array 110 through the radio unit 120 for transmitting a respective transmission signal via a respective antenna element of the antenna array 110. Each of the reception chains $11_1$, $11_2$, $11_3$ and $11_4$ refers to a respective signal reception path from the antenna array 110 to the BBU 130 through the radio unit 120 for receiving a respective reception signal via a respective antenna element of the antenna array 110. Thus, the transmission and reception chains comprise a plurality of signal processing elements or stages (such as mixing stages, modulating or demodulating stages, filter stages, coding or decoding stages, amplifying stages, etc.) required for transmitting or receiving transmission signals and feeder cables connecting the radio unit 120 to the antenna array 110.

Depending on a transmission or reception calibration operation, respective switching elements $S_1$, $S_2$, $S_3$ and $S_4$ and a calibration switching element $S_c$ are switched by a control function (not shown) to predetermined switching positions. In the case of reception calibration as shown in FIG. 1, the switching elements $S_1$ to $S_4$ are switched to the reception chains $12_1$, $12_2$, $12_3$ and $12_4$, so that the antenna elements are connected to respective reception chains $12_1$, $12_2$, $12_3$ and $12_4$ and the reception chains $12_1$, $12_2$, $12_3$ and $12_4$ can be calibrated. In the meanwhile, the calibration switching element $S_c$ is switched to the calibration transmission chain $11_c$ and connected to a combining or branching element 115 (e.g., passive power combiner/splitter), so that a calibration coupling path can be formed.

In the operation of reception calibration, a calibration signal is forwarded through the calibration transmission chain 11 and branched to the reception chains $12_1$, $12_2$, $12_3$ and $12_4$. By comparing the calibration signal and its distorted versions received through the reception chains $12_1$, $12_2$, $12_3$ and $12_4$, a calibration vector ($\vec{w}_r$), whose elements are to be applied to the respective reception chains $12_1$, $12_2$, $12_3$ and $12_4$, may be determined for compensating the signal response characteristic differences among the reception chains $12_1$, $12_2$, $12_3$ and $12_4$. Because the signal response characteristic includes both the phase rotation characteristic and the amplitude scaling characteristic as described above, each element of the calibration vector ($\vec{w}_r$) may accordingly contain an amplitude scaling calibration component x and a phase rotation calibration component y and be expressed as a complex exponential $xe^{jy}$.

In the case of transmission calibration, the switching elements $S_1$, $S_2$, $S_3$ and $S_4$ are switched to the transmission chains $11_1$, $11_2$, $11_3$ and $11_4$ and the calibration switching element $S_c$ is switched to the calibration reception chain $12_c$. Orthogonal calibration signals are forwarded through the transmission chains $11_1$, $11_2$, $11_3$ and $11_4$, combined at the combining or branching element 115 and then forwarded to the calibration reception chain $12_c$. By comparing the orthogonal calibration signals and their distorted versions received through the calibration reception chain $12_c$, a calibration vector ($\vec{w}_t$), whose elements are to be applied to the respective reception chains $12_1$, $12_2$, $12_3$ and $12_4$, may be determined for compensating the signal response characteristic differences among the transmission chains $11_1$, $11_2$, $11_3$ and $11_4$.

To further enhance system performance, the so-called Coordinated Multiple-Point Transmission (CoMP) technology has been introduced to LTE. As one of various CoMP schemes, the Joint Transmission (JT) scheme is characterized in that two or more transceivers are coordinated to jointly transmit data to a User Equipment (UE), as illustrated in FIG. 2. Such an arrangement not only increases desired signal power received at the UE but also reduces interference among the transceivers.

To guarantee coherent reception at the UE, it is not enough to just conduct the above-described intra-transceiver antenna calibration within each of the transceivers to compensate the signal response characteristic differences among the reception/transmission chains of the respective transceiver. Instead, inter-transceiver antenna calibration, which allows signal response characteristic differences among reference transmission/reception chains of different transceivers to be compensated for, is indispensable.

For the inter-transceiver antenna calibration, WO20110544144A1 and CN102149123A propose a solution called node-assistant inter-transceiver antenna calibration, wherein a wireless-enabled assistant node (such as a relay, a micro station or a UE) is introduced for inter-transceiver antenna calibration as illustrated in FIG. 3. In the case of inter-transceiver antenna reception calibration, transceivers involved in CoMP receive a calibration signal from the assistant node and calibrate their reference reception chains according to a comparison between the calibration signal and its distorted versions received at the transceivers. In the case of inter-transceiver antenna transmission calibration, the assistant node receives orthogonal calibration signals from the transceivers, determines calibration parameters for calibrating the reference transmission chains of the transceivers according to a comparison between the orthogonal calibration signals and their distorted versions received by the assistant node, and feeds the calibration parameters respectively back to the transceivers.

Thus, without the assistant node, it is impossible to implement the node-assistant inter-transceiver antenna calibration among the transceivers involved in CoMP. Moreover, as propagation paths between respective transceivers and the assistant node differ from each other, the distortions of the calibration signal by the propagation paths cannot be cancelled out for inter-transceiver antenna calibration, which is intended to compensate signal response characteristic differences among reference transmission/reception chains of different transceivers. As a result, the node-assistant inter-transceiver antenna calibration solution, which is based on the comparison between the calibration signal and its distorted versions received over the different propagation paths, inherently suffers from calibration inaccuracy.

In addition, to carry out the inter-transceiver antenna calibration, the node-assistant inter-transceiver antenna calibration solution requires one assistant node to be deployed for each CoMP set. For a typical radio network which may comprise hundreds or thousands of CoMP sets, efforts and costs incurred by deploying assistant nodes are considerable.

For the inter-transceiver antenna calibration, CN102843173A discloses another solution called transceiver-assistant inter-transceiver antenna calibration as illustrated in FIG. 4, wherein one of the transceivers involved in CoMP is selected to work as the assistant node in the node-assistant inter-transceiver antenna calibration solution. However, as the underlining principle of the transceiver-assistant inter-transceiver antenna calibration is the same as that of the node-assistant inter-transceiver antenna calibration, the distortions of the calibration signal by propagation paths between the selected transceiver and respective transceivers other than the selected one cannot be cancelled out, either. Consequently, the calibration inaccuracy still exists. In addition, the transceiver-assistant inter-transceiver antenna calibration cannot be implemented in a scenario where it is impossible to find a third transceiver that can work as an assistant node for only two transceivers involved in CoMP.

SUMMARY

In view of the foregoing, an object of the disclosure is to overcome at least one of the drawbacks of the above-described inter-transceiver antenna calibration solutions.

To achieve this object, according to a first aspect of the disclosure, there is provided a method in a base station of a radio network for antenna calibration of a first transceiver of the base station with respect to a second transceiver. Each of the first and the second transceivers comprises one or more pairs of transmission chains and reception chains and a pair of a calibration transmission chain and a calibration reception chain. The method comprises at least one of a first group of steps and a second group of steps. The first group of steps comprises collecting a first group of amplitude and phase differences between a first calibration signal and each of a first and a fourth reception signals and between a second calibration signal and each of a second and a third reception signals. The first calibration signal is transmitted through one of the transmission chains of the first transceiver and received respectively through the calibration reception chain of the first transceiver and the calibration reception chain of the second transceiver as the first and the fourth reception signals, The second calibration signal is transmitted through one of the transmission chains of the second transceiver and received respectively through the calibration reception chains as the second and the third reception signals. The first group of steps further comprises estimating, based on the first group of amplitude and phase differences, a signal response characteristic difference between the calibration reception chain of the first transceiver and the calibration reception chain of the second transceiver for reference antenna reception calibration of the first transceiver with respect to the second transceiver. The second group of steps comprises collecting a second group of amplitude and phase differences between a third calibration signal and each of a fifth and a seventh reception signals and between a fourth calibration signal and each of a sixth and an eighth reception signals, wherein the third calibration signal is transmitted through the calibration transmission chain of the first transceiver and received respectively through one of the reception chains of the first transceiver and one of the reception chains of the second transceiver as the fifth and the seventh reception signals and the fourth calibration signal is transmitted through the calibration transmission chain of the second transceiver and received respectively through the one of the reception chains of the first transceiver and the one of the reception chains of the second transceiver as the sixth and the eighth reception signals. The second group of steps further comprises estimating, based on the second group of amplitude and phase differences, a signal response characteristic difference between the calibration transmission chain of the first transceiver and the calibration transmission chain of the second transceiver for reference antenna transmission calibration of the first transceiver with respect to the second transceiver.

According to a second aspect of the disclosure, there is provided an apparatus of a base station in a radio network for antenna calibration of a first transceiver of the base station with respect to a second transceiver. Each of the first and the second transceivers comprises one or more pairs of transmission chains and reception chains and a pair of a calibration transmission chain and a calibration reception chain. The apparatus comprises an amplitude and phase difference collecting section and a signal response characteristic difference estimation section. The amplitude and phase difference collecting section is configured to perform at least one of the functions of collecting a first group of amplitude and phase differences between a first calibration signal and each of a first and a fourth reception signals and between a second calibration signal and each of a second and a third reception signals and collecting a second group of amplitude and phase differences between a third calibration signal and each of a fifth and a seventh reception signals and between a fourth calibration signal and each of a sixth and an eighth reception signals. The first calibration signal is transmitted through one of the transmission chains of the first transceiver and received respectively through the calibration reception chain of the first transceiver and the calibration reception chain of the second transceiver as the first and the fourth reception signals and the second calibration signal is transmitted through one of the transmission chains of the second transceiver and received respectively through the calibration reception chains as the second and the third reception signals. The third calibration signal is transmitted through the calibration transmission chain of the first transceiver and received respectively through one of the reception chains of the first transceiver and one of the reception chains of the second transceiver as the fifth and the seventh reception signals and the fourth calibration signal is transmitted through the calibration transmission chain of the second transceiver and received respectively through the one of the reception chains of the first transceiver and the one of the reception chains of the second transceiver as the sixth and the eighth reception signals. The signal response characteristic difference estimation section is configured to perform at least one of the functions of estimating, based on the first group of amplitude and phase differences, a signal response characteristic difference between the calibration reception chain of the first transceiver and the calibration reception chain of the second transceiver for reference antenna reception calibration of the first transceiver with respect to the second transceiver and estimating, based on the second group of amplitude and phase differences, a signal response characteristic difference between the calibration transmission chain of the first transceiver and the calibration transmission chain of the second transceiver for reference antenna transmission calibration of the first transceiver with respect to the second transceiver.

Without involving a third party besides the first and the second transceivers, the solutions according to the first and the second aspects of the disclosure are applicable to a scenario where antenna calibration is to be conducted between only two transceivers and the effort and cost for deploying an assistant node as a third party can be saved accordingly.

Moreover, with the first group of amplitude and phase differences between the first calibration signal and each of the first and the fourth reception signals and between the second calibration signal and each of the second and the third reception signals, a direct result of the signal response characteristic difference between the calibration reception chain of the first transceiver and the calibration reception chain of the second transceiver can be estimated. This result is certainly immune to the calibration inaccuracy incurred by different propagation paths between respective transceivers and the assistant node or between the selected transceiver and receptive transceivers other than the selected one when the above-described node-assistant or transceiver-assistant inter-transceiver antenna calibration is applied. Accordingly, it allows for accurate reference antenna reception calibration of the first transceiver with respect to the second transceiver. Likewise, with the second group of amplitude and phase differences between the third calibration signal and each of the fifth and the seventh reception signals and between the fourth calibration signal and each of the sixth and the eighth reception signals, a direct result of the signal response characteristic difference between the calibration transmission chain of the first transceiver and the calibration transmission chain of the second transceiver can be estimated for accurate reference antenna transmission calibration of the first transceiver with respect to the second transceiver.

According to a third aspect of the disclosure, there is provided a method in a base station for antenna calibration of a first transceiver of the base station with respect to a second transceiver. Each of the first and the second transceivers comprises one or more pairs of transmission chains and reception chains. The method comprises determining, for the first transceiver, a reference reciprocity between a pair of a reference transmission chain and a reference reception chain of the first transceiver selected from the one or more pairs of transmission chains and reception chains of the first transceiver. The method further comprises acquiring, from the second transceiver, a reference reciprocity between a pair of a reference transmission chain and a reference reception chain of the second transceiver selected from the one or more pairs of transmission chains and reception chains of the second transceiver. The method further comprises determining, based on the reference reciprocity for each of the first and the second transceivers, a relative reference reciprocity between the pair of the reference transmission chain and the reference reception chain of the first transceiver and the pair of the reference transmission chain and the reference reception chain of the second transceiver for reference antenna reciprocity calibration of the first transceiver with respect to the second transceiver.

According to a fourth aspect of the disclosure, there is provided an apparatus in a base station for antenna calibration of a first transceiver of the base station with respect to a second transceiver. Each of the first and the second transceivers comprises one or more pairs of transmission chains and reception chains. The apparatus comprises a reference reciprocity determination section, a reference reciprocity acquiring section and a relative reference reciprocity determination section. The reference reciprocity determination section is configured to determine, for the first transceiver, a reference reciprocity between a pair of a reference transmission chain and a reference reception chain of the first transceiver selected from the one or more pairs of transmission chains and reception chains of the first transceiver. The reference reciprocity acquiring section is configured to acquire, from the second transceiver, a reference reciprocity between a pair of a reference transmission chain and a reference reception chain of the second transceiver selected from the one or more pairs of transmission chains and reception chains of the second transceiver. The relative reference reciprocity determination section is configured to determine, based on the reference reciprocity for each of the first and the second transceivers, a relative reference reciprocity between the pair of the reference transmission chain and the reference reception chain of the first transceiver and the pair of the reference transmission chain and the reference reception chain of the second transceiver for reference antenna reciprocity calibration between of the first transceiver with respect to the second transceiver. Without involving a third party besides the first and the second transceivers, the solutions according to the third and the fourth aspects of the disclosure are also applicable to a scenario where antenna calibration is to be conducted between only two transceivers and the effort and cost for deploying an assistant node as a third party can be saved accordingly.

Additionally, as a measure of the signal response characteristic difference between the selected pair of the reference transmission chain and the reference reception chain of the respective transceiver, the reference reciprocity already eliminates the impact of the propagation path between the first and the second transceivers. Furthermore, the relative reference reciprocity derived from the reference reciprocity for each of the first and the second transceivers can accurately reflect a reciprocity difference between the selected pair of the reference transmission chain and the reference reception chain of the first transceiver and the selected pair of the reference transmission chain and the reference reception chain of the second transceiver, allowing for accurate reference antenna reciprocity calibration of the first transceiver with respect to the second transceiver.

According to a fifth aspect of the disclosure, there is provided an apparatus comprising a memory which has machine-readable program code stored therein and a processor which executes the stored program code to control the apparatus to perform the method according to any of the first and the third aspects of the present disclosure.

According to a sixth aspect of the disclosure, there is provided a base station comprising the apparatus according to any of the second, the fourth and the fifth aspects of the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. For example, although embodiments are illustratively given for antenna calibration of a first transceiver with respect to a second transceiver, by specifying one of more than two transceivers as the second transceiver and each of the other transceivers as the first transceiver, the solutions proposed by the present disclosure are applicable to antenna calibration among more than two transceivers. In addition, although each of the transceivers is illustratively described as having the same number of pairs of transmission and reception chains, the solutions proposed by the present disclosure are applicable to a case where different transceivers have different numbers of pairs of transmission and reception chains. Accordingly, the number of pairs of transmission and reception chains of the respective transceiver is not limited to 4, but can be more or less. Further, in the following, descriptions of known structures and techniques are omitted so as not to unnecessarily obscure the concept of the present disclosure. Throughout the description, same reference signs refer to same or similar elements.

Figure 1:
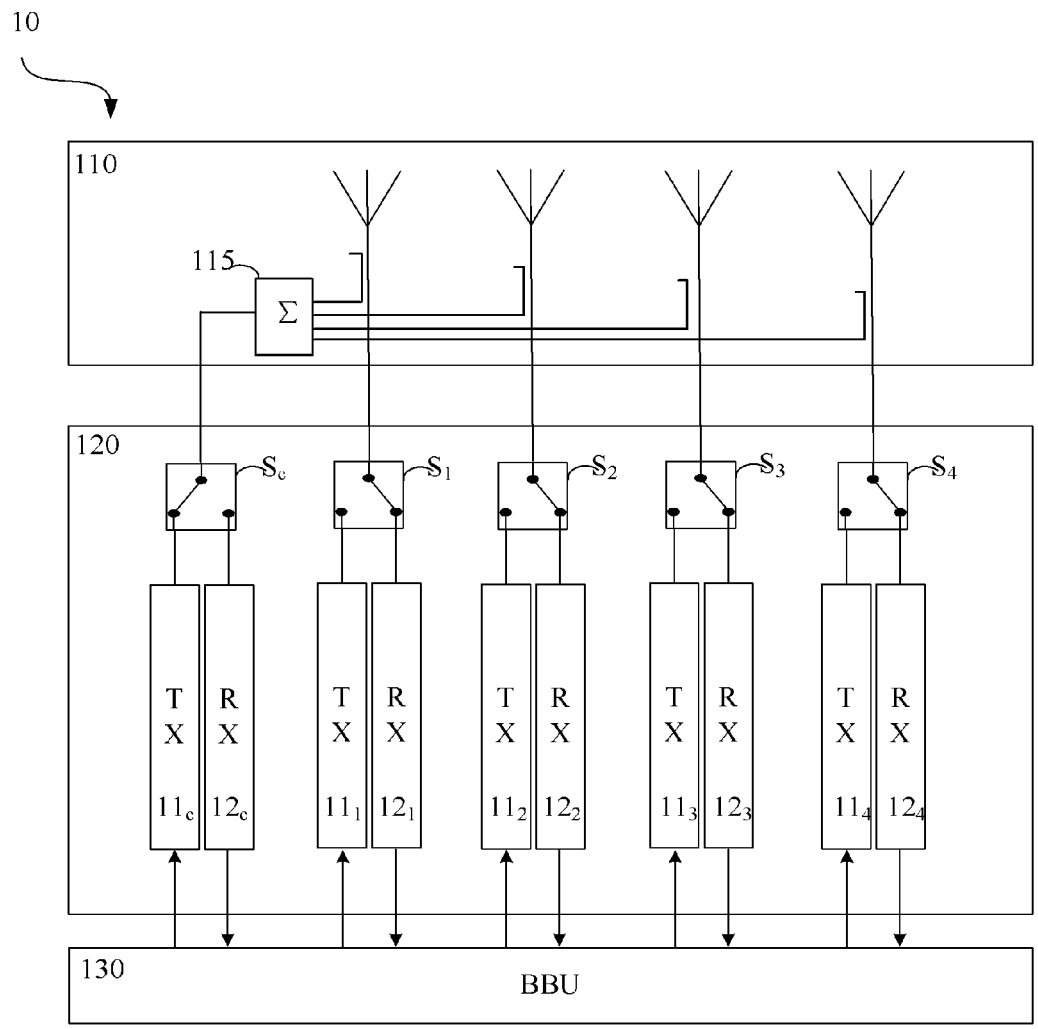
FIG. 1 is a diagram illustrating an arrangement of a multi-antenna transceiver according to the prior art.
Figure 2:
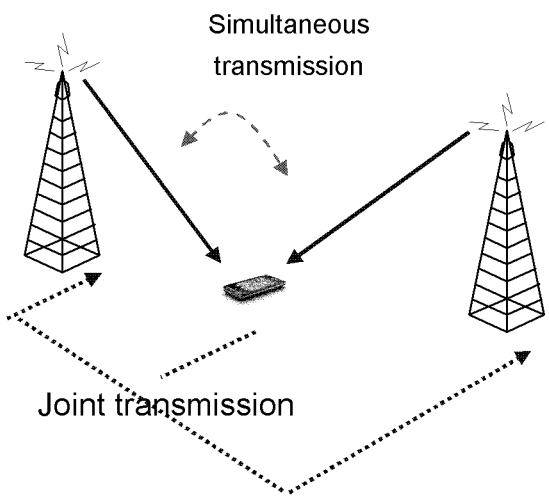
FIG. 2 is a diagram illustrating an example scenario where two base station transceivers perform joint transmission to a UE.
Figure 3:
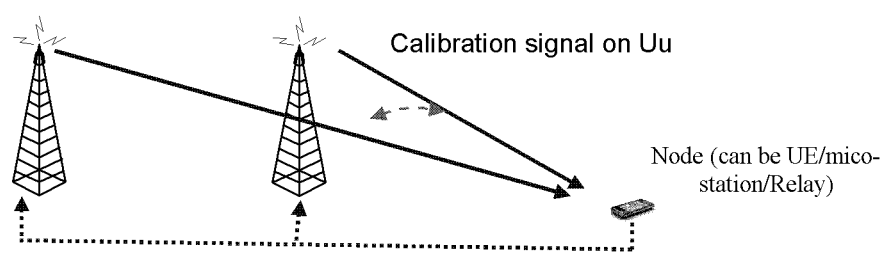
FIG. 3 is a diagram illustrating a node-assistant inter-transceiver antenna calibration solution according to the prior art.
Figure 4:
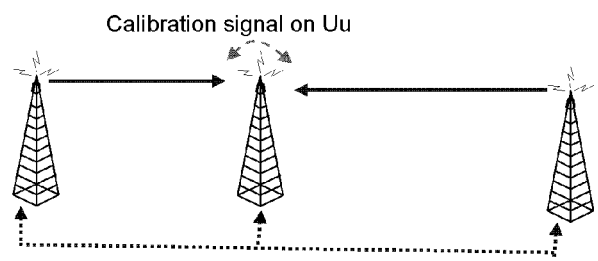
FIG. 4 is a diagram illustrating a transceiver-assistant inter-transceiver antenna calibration solution according to the prior art.
Figure 5:
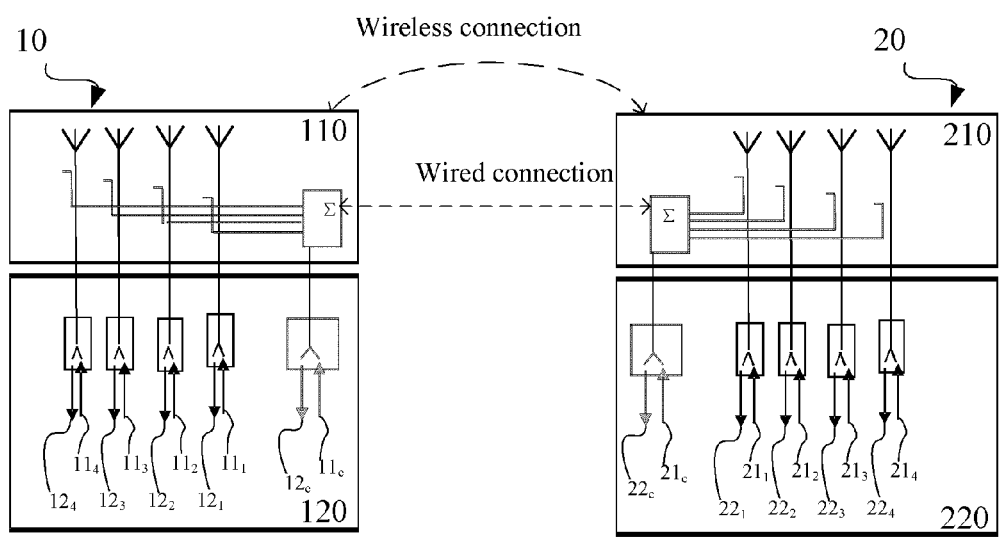
FIG. 5 is a diagram illustrating an arrangement of two transceivers that can be used with an inter-transceiver antenna calibration method according to a first aspect of the disclosure.

FIG. 5 illustrates an arrangement of two transceivers 10 and 20 that can be used with an inter-transceiver antenna calibration method according to a first aspect of the disclosure. The two multi-antenna transceivers 10 and 20 may be communicatively connected with each other via a wireless or wired connection and may be provided in the same base station or in separate base stations. The structure of each of the transceivers 10 and 20 is the same as that illustrated in FIG. 1 and will not be described redundantly.

In the following, the method in a base station of a radio network for antenna calibration of the first transceiver 10 of the base station with respect to the second transceiver 20 according to the first aspect of the disclosure will be described with respect to FIGS. 6-8.

Figure 6:
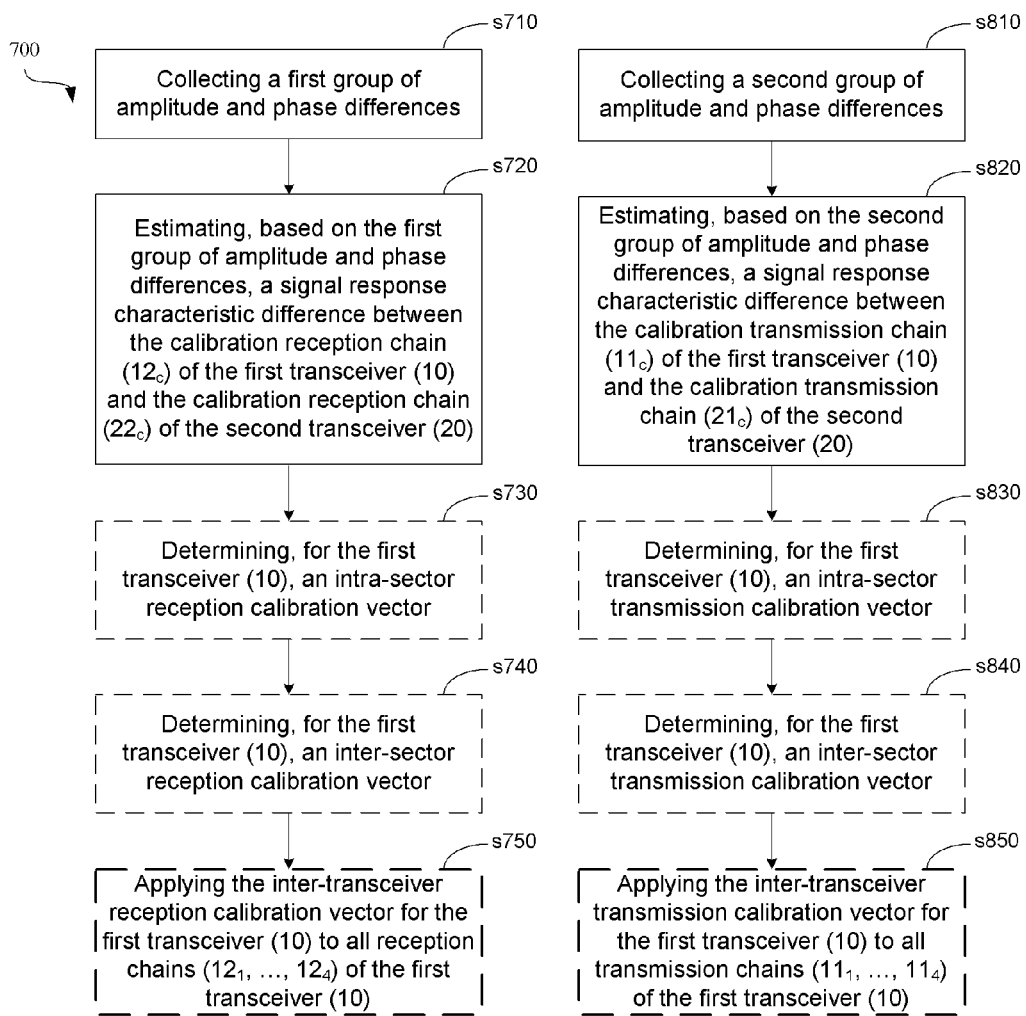
FIGS. 6-8 are flowcharts illustrating operations of the inter-transceiver antenna calibration method according to the first aspect of the disclosure.

As shown in FIG. 6, the inter-transceiver antenna calibration method comprises two independent processes, one of which relates to reception calibration and the other of which relates to transmission calibration.

The reception calibration related process begins with block s710, where a first group of amplitude and phase differences between a first calibration signal $s_1$ and each of a first and a fourth reception signals $r_1$ and $r_4$ and between a second calibration signal $s_2$ and each of a second and a third reception signals $r_2$ and $r_3$ are collected. The first calibration signal $s_1$ is transmitted through one of the transmission chains $11_1, \ldots, 11_4$ of the first transceiver 10 and received respectively through the calibration reception chain $12_c$ of the first transceiver 10 and the calibration reception chain $22_c$ of the second transceiver 20 as the first and the fourth reception signals $r_1$ and $r_4$. The second calibration signal $s_2$ is transmitted through one of the transmission chains $21_1, \ldots, 21_4$ of the second transceiver 20 and received respectively through the calibration reception chains $12_c$ and $22_c$ as the second and the third reception signals $r_2$ and $r_3$.

Then, the process proceeds to block s720, where a signal response characteristic difference between the calibration reception chain $12_c$ of the first transceiver 10 and the calibration reception chain $22_c$ of the second transceiver 20 is estimated, based on the collected amplitude and phase differences, for reference antenna reception calibration of the first transceiver with respect to the second transceiver.

In the following, an example will be given in regard to how to derive the signal response characteristic difference between the calibration reception chain $12_c$ of the first transceiver 10 and the calibration reception chain $22_c$ of the second transceiver 20 from the first group of amplitude and phase differences mathematically.

First, let $$\alpha_{11_1} e^{j\psi_{11_1}}, \alpha_{11_c} e^{j\psi_{11_c}}, \alpha_{11-20} e^{j\psi_{10}-\psi_{20}}, \alpha_{21_1} e^{j\psi_{21_1}} \text{ and } \alpha_{21_c} e^{j\psi_{21_c}}$$

respectively denote the signal response characteristics of the one of transmission chains $11_1, \ldots, 11_4$ of the first transceiver 10, the calibration reception chain $12_c$ of the first transceiver 10, the propagation path between the first transceiver 10 and the second transceiver 20, the one of the transmission chains $21_1, \ldots, 21_4$ of the second transceiver 20 and the calibration reception chain $22_c$ of the second transceiver 20, with the symbol $\alpha_x$ denoting the amplitude scaling factor of the respective chain or path x and the symbol $\psi_x$ denoting the phase rotation of the respective chain or path x. Then, the first to the fourth reception signals $r_1$-$r_4$ may be written as follows:

$$r_1 = \alpha_{11_1} * \alpha_{11_c} e^{j\psi_{11_1} + \psi_{11_c}} * s_1 + n_1 \quad (1\text{-}1)$$

$$r_2 = \alpha_{21_1} * \alpha_{21_c} e^{j\psi_{21_1} + \psi_{21_c}} * s_2 + n_2 \quad (1\text{-}2)$$

$$r_3 = \alpha_{11_c} * \alpha_{10-20} * \alpha_{21_1} e^{j\psi_{11_c} + \varphi_{10-20} + \varphi_{21_1}} * s_2 + n_3 \quad (1\text{-}3)$$

$$r_4 = \alpha_{21_c} * \alpha_{10-20} * \alpha_{11_1} e^{j\varphi_{21_c} + \varphi_{10-20} + \varphi_{11_1}} * s_1 + n_4 \quad (1\text{-}4)$$

wherein $n_1$-$n_4$ denote white noise in the reception signals $r_1$-$r_4$.

With the white noise $n_1$-$n_4$ ignored, the above formulas can be rewritten as follows:

$$r_1/s_1 \approx \alpha_{11_1} * \alpha_{11_c} e^{j\psi_{11_1} + \psi_{11_c}} \quad (2\text{-}1)$$

$$r_2/s_2 \approx \alpha_{21_1} * \alpha_{21_c} e^{j\psi_{21_1} + \psi_{21_c}} \quad (2\text{-}2)$$

$$r_3/s_2 \approx \alpha_{11_c} * \alpha_{10-20} * \alpha_{21_1} e^{j\psi_{11_c} + \varphi_{10-20} + \varphi_{21_1}} \quad (2\text{-}3)$$

$$r_4/s_1 \approx \alpha_{21_c} * \alpha_{10-20} * \alpha_{11_1} e^{j\varphi_{21_c} + \varphi_{10-20} + \varphi_{11_1}} \quad (2\text{-}4)$$

On the other hand, at the transceiver 10, a first amplitude and phase difference $\beta_1 e^{j\theta_1}$ between the first calibration signal $s_1$ and the first reception signal $r_1$ and a second amplitude and phase difference $\beta_3 e^{j\theta_3}$ between the second calibration signal $s_2$ and the third reception signal $r_3$ can be estimated based on any of appropriate estimation criteria, such as a Least Square (LS) error estimation criterion, a Minimum Mean Square Error (MMSE) criterion, or a zero-forcing criterion. Likewise, at the transceiver 20, a third amplitude and phase difference $\beta_2 e^{j\theta_2}$ between the second calibration signal $s_2$ and the second reception signal $r_2$ and a fourth amplitude and phase difference $\beta_4 e^{j\theta_4}$ between the first calibration signal $s_1$ and the fourth reception signal $r_4$ can be estimated.

With the estimated amplitude and phase differences $\beta_1 e^{j\theta_1}$, $\beta_2 e^{j\theta_2}$, $\beta_3 e^{j\theta_3}$ and $\beta_4 e^{j\theta_4}$, formulas 2-1 to 2-4 can be extended as follows:

$$r_1/s_1 = \beta_1 e^{j\theta_1} \approx \alpha_{11_1} * \alpha_{11_c} e^{j\psi_{11_1} + \psi_{11_c}} \quad (3\text{-}1)$$

$$r_2/s_2 = \beta_2 e^{j\theta_2} \approx \alpha_{21_1} * \alpha_{21_c} e^{j\psi_{21_1} + \psi_{21_c}} \quad (3\text{-}2)$$

$$r_3/s_2 = \beta_3 e^{j\theta_3} \approx \alpha_{11_c} * \alpha_{10-20} * \alpha_{21_1} e^{j\psi_{11_c} + \varphi_{10-20} + \varphi_{21_1}} \quad (3\text{-}3)$$

$$r_4/s_1 = \beta_4 e^{j\theta_4} \approx \alpha_{21_c} * \alpha_{10-20} * \alpha_{11_1} e^{j\varphi_{21_c} + \varphi_{10-20} + \varphi_{11_1}} \quad (3\text{-}4)$$

From the above relationships, the signal response characteristic difference between the calibration reception chain $12_c$ of the first transceiver 10 and the calibration reception chain $22_c$ of the second transceiver 20, which includes a calibration reception chain amplitude scaling difference $\gamma$ and a calibration reception chain phase rotation difference $\phi$ between the calibration reception chain $12_c$ of the first transceiver 10 and the calibration reception chain $22_c$ of the second transceiver 20, can be derived as follows:

$$\alpha_{21_c}/\alpha_{11_c} = \text{sqrt}\left(\frac{\beta_1 \beta_3}{\beta_2 \beta_4}\right) = \gamma \quad (4\text{-}1)$$

$$\varphi_{21_c} - \varphi_{11_c} = \theta_4 - [\theta_3 + \theta_4 - (\theta_1 + \theta_2)]/2 - \theta_1 = \phi \quad (4\text{-}2)$$

This result is certainly immune to the calibration inaccuracy incurred by different propagation paths between respective transceivers and the assistant node or between the selected transceiver and receptive transceivers other than the selected one when the above-described node-assistant or transceiver-assistant inter-transceiver antenna calibration is applied. Accordingly, it allows for accurate reference antenna reception calibration of the first transceiver with respect to the second transceiver.

In an embodiment, after block s720, the reception calibration related process may further proceed to block s730, where an intra-transceiver reception calibration vector $\vec{w}_{10,r}$ for compensating signal response characteristic differences between each of the reception chains $12_1, \ldots, 12_4$ and the calibration reception chain $12_c$ of the first transceiver 10 may be determined for the first transceiver 10.

Then, at block s740, an inter-transceiver reception calibration vector $\vec{w}'_{10,r}$ may be determined, for the first transceiver 10, as the intra-transceiver reception calibration vector $\vec{w}_{10,r}$ for the first transceiver 10 adjusted by the estimated signal response characteristic difference between the calibration reception chain $12_c$ of the first transceiver 10 and the calibration reception chain $22_c$ of the second transceiver 20. Mathematically, the adjustment may be achieved by expressing the estimated signal response characteristic difference between the calibration reception chain $12_c$ of the first transceiver 10 and the calibration reception chain $22_c$ of the second transceiver 20 as a complex exponential $\gamma e^{j\phi}$ and multiplying the complex exponential $\gamma e^{j\phi}$ by each element of the intra-transceiver reception calibration vector $\vec{w}_{10,r}$ which is also expressed as a complex exponential $xe^{jy}$.

Next, at block s750, the inter-transceiver reception calibration vector $\vec{w}'_{10,r}$ for the first transceiver 10 may be applied to all reception chains $12_1, \ldots, 12_4$ of the first transceiver 10.

In a case where there is only one pair of a transmission chain and a reception chain in the transceiver, the intra-transceiver reception calibration vector $\vec{w}_{10,r}$ and therefore the inter-transceiver reception calibration vector $\vec{w}'_{10,r}$ contain only one element.

In this manner, not only the calibration reception chain $12_c$ of the first transceiver 10 but also the reception chains $12_1, \ldots, 12_4$ of the first transceiver 10 can be calibrated with respect to the calibration reception chain $22_c$ of the second transceiver 20.

For a multi-carrier communications network (such as an Orthogonal Frequency Division Multiplex (OFDM) network) where a total number N of subcarriers are used for wireless communications, the first to the fourth calibration signals $s_1$-$s_4$ may be transmitted on each subcarrier k in a subset of the N subcarriers.

Figure 7:
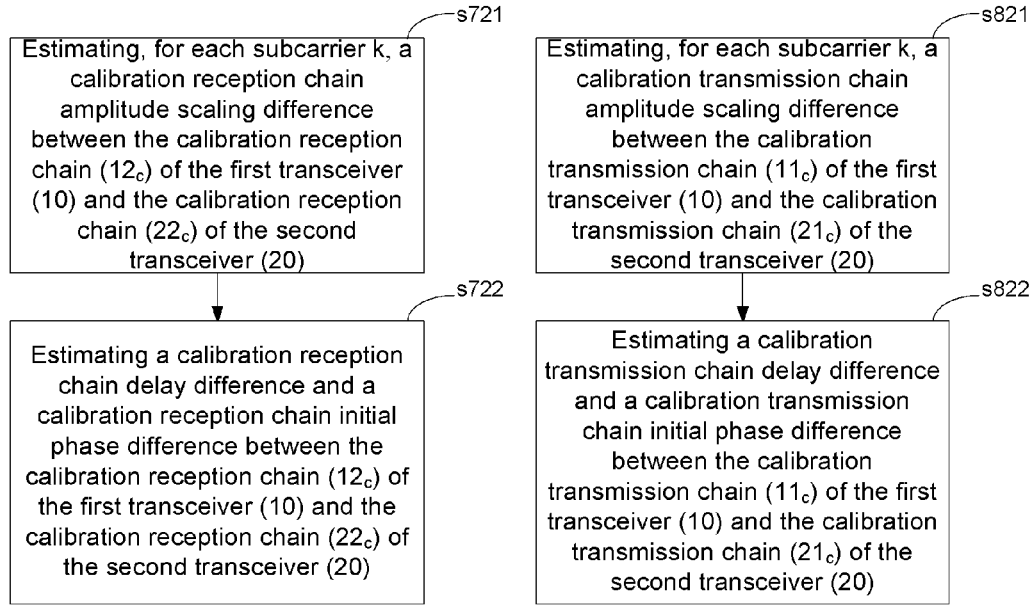

In this case, the operation shown at block s720 in FIG. 6 may comprise operations shown at blocks s721 and s722 in FIG. 7. At block s721, a calibration reception chain amplitude scaling difference $\gamma_{r,k}$ between the calibration reception chain $12_c$ of the first transceiver 10 and the calibration reception chain $22_c$ of the second transceiver 20 may be estimated for each subcarrier k. According to the example derivation given above (in particular, formula 4-1), for each subcarrier k, the calibration reception chain amplitude scaling difference $\gamma_{r,k}$ may be estimated as $$\text{sqrt}\left(\frac{\beta_1\beta_3}{\beta_2\beta_4}\right).$$

Supposing there is a linear relationship between the index of each subcarrier k and a calibration reception chain phase rotation difference $\phi_k$ for the respective subcarrier k between the calibration reception chain $12_c$ of the first transceiver 10 and the calibration reception chain $22_c$ of the second transceiver 20 (that is $$\varphi_k = \frac{2\pi}{N} \times k \times \Delta_{t,r}/T_s + \varphi_{ini,r} + n_k,$$

where $\Delta_{t,r}$ is indicative of one of the factors constituting the slope of the linear relationship and denotes a calibration reception chain delay difference between the calibration reception chain $12_c$ of the first transceiver 10 and the calibration reception chain $22_c$ of the second transceiver 20, $\phi_{ini,r}$ is indicative of the initial value of the linear relationship and denotes a calibration reception chain initial phase difference between the calibration reception chain $12_c$ of the first transceiver 10 and the calibration reception chain $22_c$ of the second transceiver 20, $T_s$ denotes a duration of a modulated symbol and $n_k$ denotes white noise for subcarrier k), the calibration reception chain delay difference $\Delta_{t,r}$ and the calibration reception chain initial phase difference $\phi_{ini,r}$ between the calibration reception chain $12_c$ of the first transceiver 10 and the calibration reception chain $22_c$ of the second transceiver 20 may be estimated at block s722.

Figure 8:
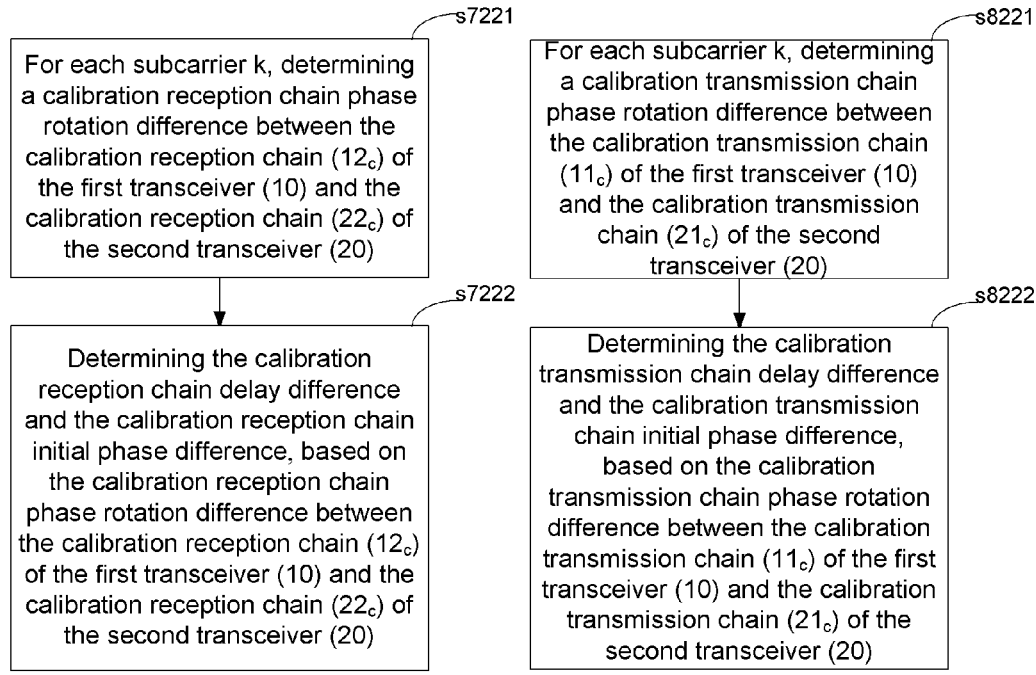

In an implementation, the operation shown at block s722 may comprises operations shown at blocks s7221 and s7222 in FIG. 8. At block s7221, for each subcarrier k, the calibration reception chain phase rotation difference $\phi_k$ between the calibration reception chain $12_c$ of the first transceiver 10 and the calibration reception chain $22_c$ of the second transceiver 20 is determined. According to the example derivation given above (in particular, formula 4-2), for each subcarrier k, the calibration reception chain phase rotation difference $\phi_k$ may be estimated as $\theta_4-[\theta_3+\theta_4-(\theta_1+\theta_2)]/2-\theta_1$.

At block s7222, the calibration reception chain delay difference $\Delta_{t,r}$ and the calibration reception chain initial phase difference $\phi_{ini,r}$ are determined based on the calibration reception chain phase rotation difference $\phi_k$ between the calibration reception chain $12_c$ of the first transceiver 10 and the calibration reception chain $22_c$ of the second transceiver 20.

For determining the calibration reception chain delay difference $\Delta_{t,r}$ and the calibration reception chain initial phase difference $\phi_{ini,r}$ based on the calibration reception chain phase rotation difference $\phi_k$, various estimation criteria such as an LS polynomial fitting criterion, a minimax fitting criterion, a zero-forcing criterion or a minimum mean square criterion may be applied. In a case where the LS polynomial fitting criterion is applied, the calibration reception chain delay difference $\Delta_{t,r}$ may be determined as $$\frac{L \cdot \sum_{k \in K}(k \cdot \varphi_k) - \sum_{k \in K}\varphi_k \cdot \sum_{k \in K} k}{L \cdot \sum_{k \in K} k^2 - \left(\sum_{k \in K} k\right)^2} * \frac{N}{2\pi}.$$

The calibration reception chain initial phase difference $\phi_{ini,r}$ may be determined as $$\frac{\sum_{k \in K}(k \cdot \varphi_k) \cdot \sum_{k \in K} k - \sum_{k \in K}\varphi_k \cdot \sum_{k \in K} k^2}{\left(\sum_{k \in K} k\right)^2 - L \cdot \sum_{k \in K} k^2},$$

wherein K is a set of indexes of the subcarriers in the subset and L is the number of subcarriers in the subset.

In practical implementation, the calibration reception chain delay difference $\Delta_{t,r}$ between the calibration reception chain $12_c$ of the first transceiver 10 and the calibration reception chain $22_c$ of the second transceiver 20 may be reflected in the inter-transceiver reception calibration vector $\vec{w}'_{10,r}$ for the first transceiver 10 and compensated for by intermediate frequency timing adjustment for the reception chains of the first transceiver 10. The residual delay after the intermediate frequency timing adjustment and the calibration reception chain initial phase difference $\phi_{ini,r}$ may be compensated at base band.

In addition to or instead of the reception calibration related process described above, the transmission calibration related process may be performed for antenna calibration of the first transceiver with respect to the second transceiver.

Referring back to FIG. 6, the transmission calibration related process begins with block s810, where a second group of amplitude and phase differences between a third calibration signal $s_3$ and each of a fifth and a seventh reception signals $r_5$ and $r_7$ and between a fourth calibration signal $s_4$ and each of a sixth and an eighth reception signals $r_6$ and $r_8$ are collected. The third calibration signal $s_3$ is transmitted through the calibration transmission chain $11_c$ of the first transceiver 10 and received respectively through one of the reception chains $12_1, \ldots, 12_4$ of the first transceiver 10 and one of the reception chains $22_1, \ldots, 22_4$ of the second transceiver 10 as the fifth and the seventh reception signals $r_5$ and $r_7$. The fourth calibration signal $s_4$ is transmitted through the calibration transmission chain $21_c$ of the second transceiver 20 and received respectively through the one of the reception chains $12_1, \ldots, 12_4$ of the first transceiver 10 and the one of the reception chains $22_1, \ldots, 22_4$ of the second transceiver 10 as the sixth and the eighth reception signals $r_6$ and $r_8$.

Then, the process proceeds to block S820, where a signal response characteristic difference between the calibration transmission chain $11_c$ of the first transceiver 10 and the calibration transmission chain $21_c$ of the second transceiver 20 is estimated, based on the second group of amplitude and phase differences, for reference antenna transmission calibration of the first transceiver with respect to the second transceiver.

Due to its similarity to the derivation of the signal response characteristic difference between the calibration reception chain $12_c$ of the first transceiver 10 and the calibration reception chain $22_c$ of the second transceiver 20 from the first group of amplitude and phase differences, the derivation of the signal response characteristic difference between the calibration transmission chain $11_c$ of the first transceiver 10 and the calibration transmission chain $21_c$ of the second transceiver 20 from the second group of amplitude and phase differences can be readily made by those skilled in the art and will not be described here in detail.

In an embodiment, after block s820, the transmission calibration related process may further proceed to block s830, where an intra-transceiver transmission calibration vector $\vec{w}_{10,t}$ for compensating signal response characteristic differences between each of the transmission chains $11_1, \ldots, 11_4$ and the calibration transmission chain $11_c$ of the first transceiver 10 is determined for the first transceiver 10.

Then, at block s840, an inter-transceiver transmission calibration vector $\vec{w}'_{10,t}$ is determined, for the first transceiver 10, as the intra-transceiver transmission calibration vector $\vec{w}_{10,t}$ for the first transceiver 10 adjusted by the determined difference between the calibration transmission chain $11_c$ of the first transceiver 10 and the calibration transmission chain $21_c$ of the second transceiver 20.

Mathematically, the adjustment may be achieved by expressing the estimated difference between the calibration transmission chain $11_c$ of the first transceiver 10 and the calibration transmission chain $21_c$ of the second transceiver 20 as a complex exponential $\gamma e^{j\Phi}$ and multiplying the complex exponential $\gamma e^{j\Phi}$ by each element of the intra-transceiver transmission calibration vector $\vec{w}_{10,t}$ which is also expressed as a complex exponential $xe^{jy}$.

Next, at block s850, the inter-transceiver transmission calibration vector $\vec{w}'_{10,t}$ for the first transceiver 10 is applied to all transmission chains $11_1, \ldots, 11_4$ of the first transceiver 10.

In a case where there is only one pair of a transmission chain and a reception chain in the transceiver, the intra-transceiver transmission calibration vector $\vec{w}_{10,t}$ and therefore the inter-transceiver transmission calibration vector $\vec{w}'_{10,t}$ contain only one element.

For a multi-carrier communications network (such as an Orthogonal Frequency Division Multiplex (OFDM) network) where a total number N of subcarriers are used for wireless communications, the fifth to the eighth calibration signals $s_5$-$s_8$ may be transmitted on each subcarrier k in a subset of the N subcarriers.

In this case, the operation shown at block s820 in FIG. 6 may comprise operations shown at blocks s821 and s822 in FIG. 7. At block s821, a calibration transmission chain amplitude scaling difference $\gamma_{t,k}$ between the calibration transmission chain $11_c$ of the first transceiver 10 and the calibration transmission chain 210 of the second transceiver 20 may be estimated for each subcarrier k, for example, as $$\text{sqrt}\left(\frac{\beta_5 \beta_7}{\beta_6 \beta_8}\right),$$

wherein $\beta_5$ is a fifth amplitude difference between the third calibration signal $s_3$ and the fifth reception signal $r_5$, $\beta_6$ is a sixth amplitude difference between the fourth calibration signal $s_4$ and the sixth reception signal $r_6$, $\beta_7$ is a seventh amplitude difference between the third calibration signal $s_3$ and the seventh reception signal $r_7$, and $\beta_8$ is an eighth amplitude difference between the fourth calibration signal $s_4$ and the eighth reception signal $r_8$.

At block s822, a calibration transmission chain delay difference $\Delta_{t,t}$ and a calibration transmission chain initial phase difference $\phi_{ini,t}$ between the calibration transmission chain $11_c$ of the first transceiver 10 and the calibration transmission chain $21_c$ of the second transceiver 20 are estimated.

In an implementation, the operation shown at block s822 may comprise operations shown at blocks s8221 and s8222 in FIG. 8. At block s8221, for each subcarrier k, a calibration transmission chain phase rotation difference $\phi_k$ between the calibration transmission chain $11_c$ of the first transceiver 10 and the calibration transmission chain $21_c$ of the second transceiver 20 is determined as $\theta_8-[\theta_7+\theta_8-(\theta_5+\theta_6)]/2-\theta_5$, wherein $\theta_5$ is a fifth phase difference between the third calibration signal $s_3$ and the fifth reception signal $r_5$, $\theta_6$ is a sixth phase difference between the fourth calibration signal $s_4$ and the sixth reception signal $r_6$, $\theta_7$ is a seventh phase difference between the third calibration signal $s_3$ and the seventh reception signal $r_7$ and $\theta_8$ is an eighth phase difference between the fourth calibration signal $s_4$ and the eighth reception signal $r_8$.

At block s8222, the calibration transmission chain delay difference $\Delta_{t,t}$ and the calibration transmission chain initial phase difference $\phi_{ini,t}$ are determined based on the calibration transmission chain phase rotation difference $\theta_k$ between the calibration transmission chain $11_c$ of the first transceiver 10 and the calibration transmission chain $21_c$ of the second transceiver 20.

Various estimation criteria such as an LS polynomial fitting criterion, a minimax fitting criterion, a zero-forcing criterion or a minimum mean square criterion may be used to estimate the calibration transmission chain delay difference $\Delta_{t,t}$ and the calibration transmission chain initial phase difference $\phi_{ini,t}$.

In a case where the LS polynomial fitting criterion is applied, the calibration transmission chain delay difference $\Delta_{t,t}$ may be determined as $$\frac{L \cdot \sum_{k \in K}(k \cdot \phi_k) - \sum_{k \in K} \phi_k \cdot \sum_{k \in K} k}{L \cdot \sum_{k \in K} k^2 - \left(\sum_{k \in K} k\right)^2} * \frac{N}{2\pi}.$$

The calibration transmission chain initial phase difference $\phi_{ini,t}$ may be determined as $$\frac{\sum_{k \in K}(k \cdot \phi_k) \cdot \sum_{k \in K} k - \sum_{k \in K} \phi_k \cdot \sum_{k \in K} k^2}{\left(\sum_{k \in K} k\right)^2 - L \cdot \sum_{k \in K} k^2}.$$

In practical implementation, the calibration reception chain delay difference $\Delta_{t,t}$ between the calibration transmission chain $11_c$ of the first transceiver 10 and the calibration transmission chain $21_c$ of the second transceiver 20 may be reflected in the inter-transceiver transmission calibration vector $\vec{w}'_{10,t}$ for the first transceiver 10 and compensated for by intermediate frequency timing adjustment for the transmission chains of the first transceiver 10. The residual delay after the intermediate frequency timing adjustment and the calibration transmission chain initial phase difference $\phi_{ini,t}$ may be compensated at base band.

Figure 9:
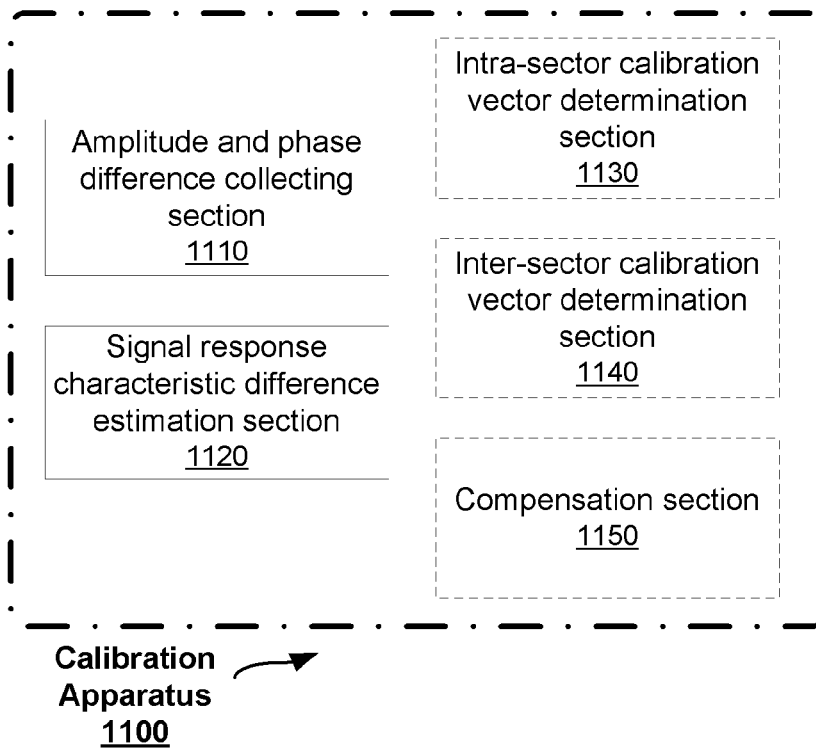
FIGS. 9-11 are block diagrams illustrating modules of an apparatus for inter-transceiver antenna calibration according to the first aspect of the disclosure.

FIG. 9 is a schematic block diagram of an apparatus 1100 in a base station of a radio network for inter-transceiver antenna calibration of a first transceiver 10 of the base station with respect to a second transceiver 20 according to the first aspect of the disclosure.

As illustrated, the apparatus 1100 comprises an amplitude and phase difference collecting section 1110 and a signal response characteristic difference estimation section 1120. The amplitude and phase difference collecting section 1110 is configured to collect a first group of amplitude and phase differences between a first calibration signal $s_1$ and each of a first and a fourth reception signals $r_1$ and $r_4$ and between a second calibration signal $s_2$ and each of a second and a third reception signals $r_2$ and $r_3$. The first calibration signal $s_1$ is transmitted through one of transmission chains $11_1, \ldots, 11_4$ of the first transceiver 10 and received respectively through a calibration reception chain $12_c$ of the first transceiver 10 and a calibration reception chain $22_c$ of the second transceiver 20 as the first and the fourth reception signals $r_1$ and $r_4$ and the second calibration signal $s_2$ is transmitted through one of transmission chains $21_1, \ldots, 21_4$ of the second transceiver 20 and received respectively through the calibration reception chains $12_c$ and $22_c$ as the second and the third reception signals $r_2$ and $r_3$. Alternatively or additionally, the amplitude and phase difference collecting section 1110 is configured to collect a second group of amplitude and phase differences between a third calibration signal $s_3$ and each of a fifth and a seventh reception signals $r_5$ and $r_7$ and between a fourth calibration signal $s_4$ and each of a sixth and an eighth reception signals $r_6$ and $r_8$. The third calibration signal $s_3$ is transmitted through a calibration transmission chain $11_c$ of the first transceiver 10 and received respectively through one of reception chains $12_1, \ldots, 12_4$ of the first transceiver 10 and one of reception chains $22_1, \ldots, 22_4$ of the second transceiver 10 as the fifth and the seventh reception signals $r_5$ and $r_7$ and the fourth calibration signal $s_4$ is transmitted through a calibration transmission chain $21_c$ of the second transceiver 20 and received respectively through the one of the reception chains $12_1, \ldots, 12_4$ of the first transceiver 10 and the one of the reception chains $22_1, \ldots, 22_4$ of the second transceiver 10 as the sixth and the eighth reception signals $r_6$ and $r_8$.

The signal response characteristic difference estimation section 1120 is configured to estimate, based on the first group of amplitude and phase differences, a signal response characteristic difference between the calibration reception chain $12_c$ of the first transceiver 10 and the calibration reception chain $22_c$ of the second transceiver 20 for reference antenna reception calibration of the first transceiver with respect to the second transceiver. Alternatively or additionally, the signal response characteristic difference estimation section 1120 is configured to estimate, based on the second group of amplitude and phase differences, a signal response characteristic difference between the calibration transmission chain $11_c$ of the first transceiver 10 and the calibration transmission chain $21_c$ of the second transceiver 20 for reference antenna transmission calibration of the first transceiver with respect to the second transceiver.

In an embodiment, the apparatus 1100 may further comprise an intra-transceiver calibration vector determination section 1130, an inter-transceiver calibration vector determination section 1140 and a compensation section 1150.

The intra-transceiver calibration vector determination section 1130 may be configured to determine, for the first transceiver 10, an intra-transceiver reception calibration vector $\vec{w}_{10,r}$ for compensating signal response characteristic differences between each of the reception chains $12_1, \ldots, 12_4$ and the calibration reception chain $12_c$ of the first transceiver 10. Alternatively or additionally, the intra-transceiver calibration vector determination section 1130 may be configured to determine, for the first transceiver 10, an intra-transceiver transmission calibration vector $\vec{w}_{10,t}$ for compensating signal response characteristic differences between each of the transmission chains $11_1, \ldots, 11_4$ and the calibration transmission chain $11_c$ of the first transceiver 10.

The inter-transceiver calibration vector determination section 1140 may be configured to determine, for the first transceiver 10, an inter-transceiver reception calibration vector $\vec{w}'_{10,r}$, wherein the inter-transceiver reception calibration vector $\vec{w}'_{10,r}$ for the first transceiver 10 is determined as the intra-transceiver reception calibration vector $\vec{w}'_{10,r}$ for the first transceiver 10 adjusted by the estimated difference between the calibration reception chain $12_c$ of the first transceiver 10 and the calibration reception chain $22_c$ of the second transceiver 20. Alternatively or additionally, the inter-transceiver calibration vector determination section 1140 may be configured to determine, for the first transceiver 10, an inter-transceiver transmission calibration vector $\vec{w}'_{10,t}$, wherein the inter-transceiver transmission calibration vector $\vec{w}'_{10,t}$ for the first transceiver 10 is determined as the intra-transceiver transmission calibration vector $\vec{w}_{10,t}$ for the first transceiver 10 adjusted by the estimated difference between the calibration transmission chain $11_c$ of the first transceiver 10 and the calibration transmission chain $21_c$ of the second transceiver 20.

The compensation section 1150 may be configured to apply the inter-transceiver reception calibration vector $\vec{w}'_{10,r}$ for the first transceiver 10 to all reception chains $12_1, \ldots, 12_4$ of the first transceiver 10. Alternatively or additionally, the compensation section 1150 may be configured to apply the inter-transceiver transmission calibration vector $\vec{w}'_{10,t}$ for the first transceiver 10 to all transmission chains $11_1, \ldots, 11_4$ of the first transceiver 10.

Figure 10:
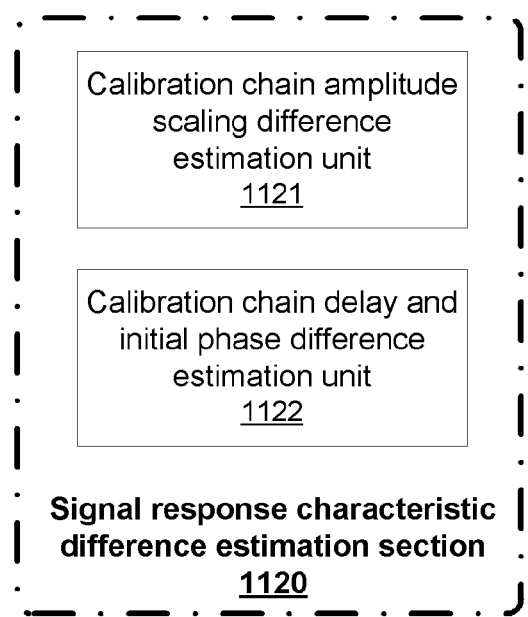

In a case where a total number N of subcarriers are used for wireless communications in the radio network and a subset of the N subcarriers are used to transmit the first to the fourth calibration signals, the signal response characteristic difference estimation section 1120 of the apparatus 1100 may comprise a calibration chain amplitude scaling difference estimation unit 1121 and a calibration chain delay and initial phase difference estimation unit 1122 as illustrated in FIG. 10.

The calibration chain amplitude scaling difference estimation unit 1121 may be configured to estimate, for each subcarrier k in the subset, a calibration reception chain amplitude scaling difference $\gamma_{r,k}$ between the calibration reception chain $12_c$ of the first transceiver 10 and the calibration reception chain $22_c$ of the second transceiver 20. Alternatively or additionally, the calibration chain amplitude scaling difference estimation unit 1121 may be configured to estimate, for each subcarrier k in the subset, a calibration transmission chain amplitude scaling difference $\gamma_{t,k}$ between the calibration transmission chain $11_c$ of the first transceiver 10 and the calibration transmission chain $21_c$ of the second transceiver 20.

The calibration chain delay and initial phase difference estimation unit 1122 may be configured to estimate a calibration reception chain delay difference $\Delta t_r$ and a calibration reception chain initial phase difference $\phi_{ini,r}$ between the calibration reception chain $12_c$ of the first transceiver 10 and the calibration reception chain $22_c$ of the second transceiver 20. Alternatively or additionally, the calibration chain delay and initial phase difference estimation unit 1122 may be configured to estimate a calibration transmission chain delay difference $\Delta t_t$ and a calibration transmission chain initial phase difference $\phi_{ini,t}$ between the calibration transmission chain $11_c$ of the first transceiver 10 and the calibration transmission chain $21_c$ of the second transceiver 20.

In an embodiment, the calibration chain amplitude scaling difference estimation unit 1121 may be configured to, for each subcarrier k in the subset, estimate the calibration reception chain amplitude scaling difference $\gamma_{r,k}$ as $$\mathrm{sqrt}\left(\frac{\beta_1\beta_3}{\beta_2\beta_4}\right),$$

wherein $\beta_1$ is a first amplitude difference between the first calibration signal $s_1$ and the first reception signal $r_1$, $\beta_2$ is a second amplitude difference between the second calibration signal $s_2$ and the second reception signal $r_2$, $\beta_3$ is a third amplitude difference between the second calibration signal $s_2$ and the third reception signal $r_3$, and $\beta_4$ is a fourth amplitude difference between the first calibration signal $s_1$ and the fourth reception signal $r_4$. Alternatively or additionally, the calibration chain amplitude scaling difference estimation unit 1121 may be configured to, for each subcarrier k in the subset, estimate the calibration transmission chain amplitude scaling difference $\gamma_{t,k}$ as $$\mathrm{sqrt}\left(\frac{\beta_5\beta_7}{\beta_6\beta_8}\right),$$

wherein $\beta_5$ is a fifth amplitude difference between the third calibration signal $s_3$ and the fifth reception signal $r_5$, $\beta_6$ is a sixth amplitude difference between the fourth calibration signal $s_4$ and the sixth reception signal $r_6$, $\beta_7$ is a seventh amplitude difference between the third calibration signal $s_3$ and the seventh reception signal $r_7$, and $\beta_8$ is an eighth amplitude difference between the fourth calibration signal $s_4$ and the eighth reception signal $r_8$.

Figure 11:
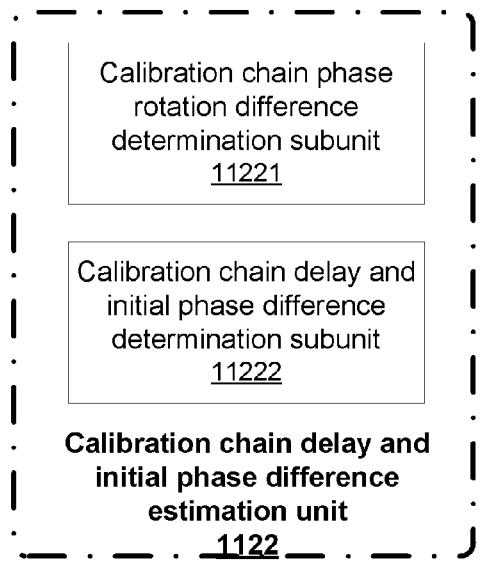

In an embodiment, the calibration chain delay and initial phase difference estimation unit 1122 may further comprise a calibration chain phase rotation difference determination subunit 11221 and a calibration chain delay and initial phase difference determination subunit 11222 as illustrated in FIG. 11.

The calibration chain phase rotation difference determination subunit 11221 may be configured to, for each subcarrier k in the subset, determine a calibration reception chain phase rotation difference $\phi_k$ between the calibration reception chain $12_c$ of the first transceiver 10 and the calibration reception chain $22_c$ of the second transceiver 20 as $\theta_4-[\theta_3+\theta_4-(\theta_1+\theta_2)]/2-\theta_1$, wherein $\theta_1$ is a first phase difference between the first calibration signal $s_1$ and the first reception signal $r_1$, $\theta_2$ is a second phase difference between the second calibration signal $s_2$ and the second reception signal $r_2$, $\theta_3$ is a third phase difference between the second calibration signal $s_2$ and the third reception signal $r_3$ and $\theta_4$ is a fourth phase difference between the first calibration signal $s_1$ and the fourth reception signal $r_4$.

Alternatively or additionally, the calibration chain phase rotation difference determination subunit 11221 may be configured to, for each subcarrier k in the subset, determine a calibration transmission chain phase rotation difference $\phi_k$ between the calibration transmission chain $11_c$ of the first transceiver 10 and the calibration transmission chain $21_c$ of the second transceiver 20 as $\theta_8-[\theta_7+\theta_8-(\theta_5+\theta_6)]/2-\theta_5$, wherein $\theta_5$ is a fifth phase difference between the third calibration signal $s_3$ and the fifth reception signal $r_5$, $\theta_6$ is a sixth phase difference between the fourth calibration signal $s_4$ and the sixth reception signal $r_6$, $\theta_7$ is a seventh phase difference between the third calibration signal $s_3$ and the seventh reception signal $r_7$ and $\theta_8$ is an eighth phase difference between the fourth calibration signal $s_4$ and the eighth reception signal $r_8$.

The calibration chain delay and initial phase difference determination subunit 11222 may be configured to determine the calibration reception chain delay difference $\Delta_{t,r}$ and the calibration reception chain initial phase difference $\phi_{ini,r}$, based on the calibration reception chain phase rotation difference $\phi_k$ between the calibration reception chain $12_c$ of the first transceiver 10 and the calibration reception chain $22_c$ of the second transceiver 20. Alternatively or additionally, the calibration chain delay and initial phase difference determination subunit 11222 may be configured to determine the calibration transmission chain delay difference $\Delta_{t,t}$ and the calibration transmission chain initial phase difference $\phi_{ini,t}$, based on the calibration transmission chain phase rotation difference $\phi_k$ between the calibration transmission chain $11_c$ of the first transceiver 10 and the calibration transmission chain $21_c$ of the second transceiver 20.

In an embodiment, the calibration chain delay and initial phase difference determination subunit 11222 may be configured to determine the calibration reception chain delay difference $\Delta_{t,r}$ as $$\frac{L\cdot\sum_{k\in K}(k\cdot\phi_k)-\sum_{k\in K}\phi_k\cdot\sum_{k\in K}k}{L\cdot\sum_{k\in K}k^2-\left(\sum_{k\in K}k\right)^2}*\frac{N}{2\pi}$$

and determine the calibration reception chain initial phase difference $\phi_{ini,r}$ as $$\frac{\sum_{k\in K}(k\cdot\varphi_k)\cdot\sum_{k\in K}k-\sum_{k\in K}\varphi_k\cdot\sum_{k\in K}k^2}{\left(\sum_{k\in K}k\right)^2-L\cdot\sum_{k\in K}k^2}.$$

Alternatively or additionally, the calibration chain delay and initial phase difference determination subunit 11222 may be configured to determine the calibration transmission chain delay difference $\Delta_{t,t}$ as $$\frac{L \cdot \sum_{k \in K}(k \cdot \phi_k) - \sum_{k \in K} \phi_k \cdot \sum_{k \in K} k}{L \cdot \sum_{k \in K} k^2 - \left(\sum_{k \in K} k\right)^2} \cdot \frac{N}{2\pi}$$

and determine the calibration transmission chain initial phase difference $\phi_{ini,t}$ as $$\frac{\sum_{k \in K}(k \cdot \phi_k) \cdot \sum_{k \in K} k - \sum_{k \in K} \phi_k \cdot \sum_{k \in K} k^2}{\left(\sum_{k \in K} k\right)^2 - L \cdot \sum_{k \in K} k^2},$$

wherein K is set of indexes of the subcarriers in the subset, and L is the number of subcarriers in the subset.

Figure 12:
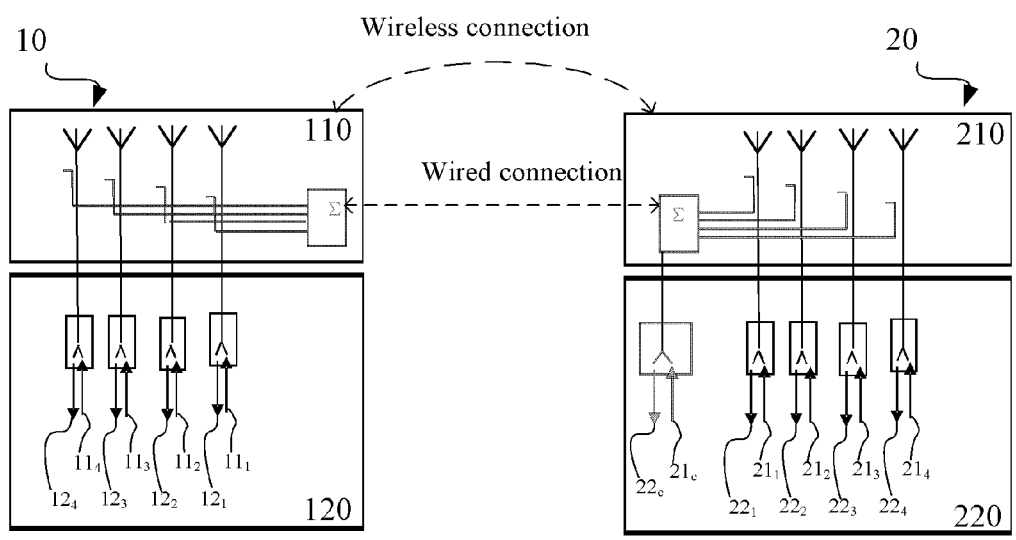
FIG. 12 is a diagram illustrating an arrangement of two transceivers that can be used with an inter-transceiver antenna calibration method according to a second aspect of the disclosure.

FIG. 12 illustrates an arrangement of two transceivers 10 and 20 that can be used with an inter-transceiver antenna calibration method according to a second aspect of the disclosure. The two multi-antenna transceivers 10 and 20 may be communicatively connected with each other via a wireless or wired connection and may be provided in the same base station or in separate base stations. The structure of each of the transceivers 10 and 20 is the same as that illustrated in FIG. 1 and will not be described redundantly.

In the following, a process of the method in a base station for antenna calibration of the first transceiver 10 of the base station with respect to the second transceiver 20 according to the second aspect of the disclosure will be described with respect to FIGS. 13-16 and 20. This method is particularly applicable to a Time Division Duplex (TDD) system, where downlink signal processing technologies (such as beamforming, pre-coding, etc) are typically applied at the network side based on an estimated channel response of the uplink radio link and thus the difference between the uplink and downlink radio links introduced by the difference between the reception and transmission chains in the transceiver is desirable to be compensated for.

Figure 13:
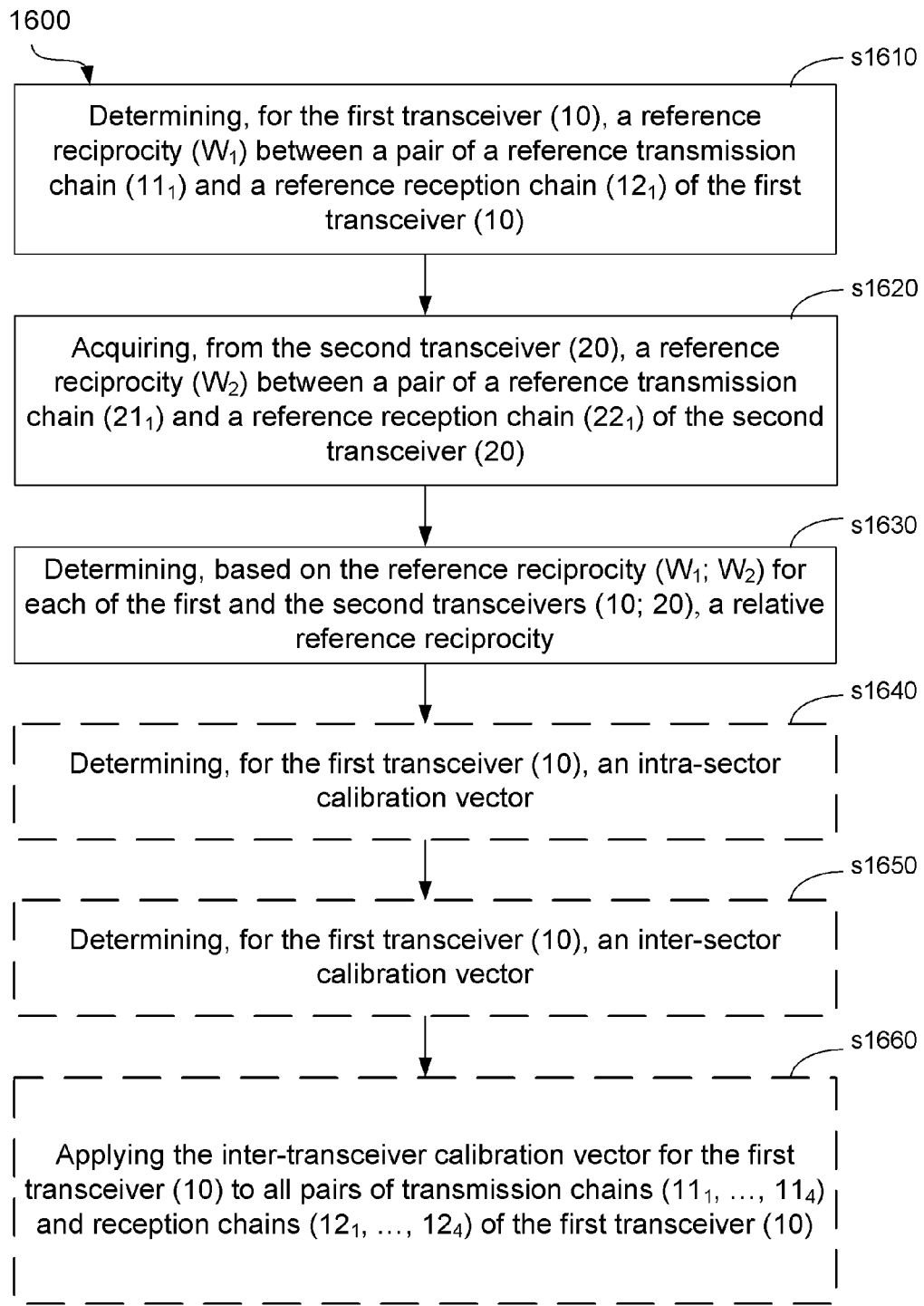
FIGS. 13-16 and 20 are flowcharts illustrating operations of the inter-transceiver antenna calibration method according to the second aspect of the disclosure.

As shown in FIG. 13, the process begins with block s1610, where a reference reciprocity $W_1$ between a pair of a reference transmission chain $11_1$ and a reference reception chain $12_1$ of the first transceiver 10 selected from the one or more pairs of transmission chains $11_1, \ldots, 11_4$ and reception chains $12_1, \ldots, 12_4$ of the first transceiver 10 is determined for the first transceiver 10.

Then, at block s1620, a reference reciprocity $W_2$ between a pair of a reference transmission chain 211 and a reference reception chain $22_1$ of the second transceiver 20 selected from the one or more pairs of transmission chains $21_1, \ldots 21_4$ and reception chains $22_1, \ldots, 22_4$ of the second transceiver 20 is acquired from the second transceiver 20.

Next, a relative reference reciprocity $\tilde{W}$ between the pair of the reference transmission chain $11_1$ and the reference reception chain $12_1$ of the first transceiver 10 and the pair of the reference transmission chain 211 and the reference reception chain $22_1$ of the second transceiver 20 is determined, based on the reference reciprocities $W_1$ and $W_2$ for the first and the second transceivers 10 and 20, for reference antenna reciprocity calibration of the first transceiver with respect to the second transceiver.

As a measure of the signal response characteristic difference between the selected pairs of the reference transmission chain and the reference reception chain of the respective transceivers, each of the reference reciprocities $W_1$ and $W_2$ already eliminates the impact of the propagation path between the first and the second transceivers 10 and 20. Accordingly, the relative reference reciprocity $\tilde{W}$ derived from the reference reciprocities $W_1$ and $W_2$ can accurately reflect a reciprocity difference between the selected pair of the reference transmission chain $11_1$ and the reference reception chain $12_1$ of the first transceiver 10 and the selected pair of the reference transmission chain 211 and the reference reception chain $22_1$ of the second transceiver 20, allowing for accurate reference antenna reciprocity calibration of the first transceiver with respect to the second transceiver.

In an embodiment, after block s1630, the process may further proceed to block s1640, where an intra-transceiver calibration vector $\vec{w}_{10}$ for compensating reciprocity differences between the pair of the reference transmission chain $11_1$ and the reference reception chain $12_1$ of the first transceiver 10 and each pair of transmission chains $11_1, \ldots, 11_4$ and reception chains $12_1, \ldots, 12_4$ of the first transceiver 10 may be determined for the first transceiver 10.

Then, at block s1650, an inter-transceiver calibration vector $\vec{w}'_{10}$ may be determined, for the first transceiver 10, as the intra-transceiver calibration vector $\vec{w}_{10}$ for the first transceiver 10 adjusted by the relative reference reciprocity $\tilde{W}$. Mathematically, the adjustment may be achieved by expressing the relative reference reciprocity as a complex exponential $\gamma e^{j\Phi}$ and multiplying the complex exponential $\gamma e^{j\Phi}$ by each element of the intra-transceiver calibration vector $\vec{w}_{10}$ which is also expressed as a complex exponential $xe^{jy}$.

Next, at block s1660, the inter-transceiver calibration vector $\vec{w}'_{10}$ for the first transceiver 10 may be applied to all pairs of transmission chains $11_1, \ldots, 11_4$ and reception chains $12_1, \ldots, 12_4$ of the first transceiver 10.

In a case where there is only one pair of a transmission chain and a reception chain in the transceiver, the intra-transceiver calibration vector $\vec{w}_{10}$ and therefore the inter-transceiver calibration vector $\vec{w}'_{10}$ contain only one element.

In this manner, not only the pair of the reference transmission chain $11_1$ and the reference reception chain $12_1$ of the first transceiver 10 but also other pairs of the transmission chains $11_2, \ldots, 11_4$ and the reception chains $12_2, \ldots, 12_4$ of the first transceiver 10 can be calibrated with respect to the pair of the reference transmission chain $21_1$ and the reference reception chain $22_1$ of the second transceiver 20.

Figure 14:
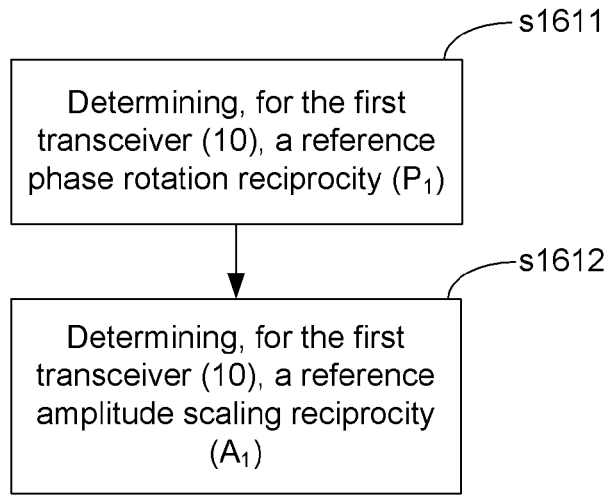

As the reference reciprocity $W_1$ can be decomposed into a reference phase rotation reciprocity $P_1$ and a reference amplitude scaling reciprocity $A_1$, the operation shown at block s1610 in FIG. 13 may comprise operations shown at blocks s1611 and s1612 as shown in FIG. 14. At block s1611, the reference phase rotation reciprocity $P_1$ is determined for the first transceiver 10. At block s1612, the reference amplitude scaling reciprocity ($A_1$) is determined for the first transceiver 10.

Accordingly, the relative reference reciprocity $\tilde{W}$ may comprise a relative reference phase rotation reciprocity $\tilde{P}$ and a relative reference amplitude scaling reciprocity $\tilde{A}$. The operation shown at block s1630 in FIG. 13 may comprise operations shown at blocks s1631 and s1632 in FIG. 20. At block s1631, the relative reference phase rotation reciprocity $\tilde{P}$ is determined as a difference between the reference phase rotation reciprocity $P_1$ for the first transceiver 10 and the reference phase rotation reciprocity $P_2$ for the second transceiver 20. At block s1632, the relative reference amplitude scaling reciprocity $\tilde{A}$ is determined as a difference between the reference amplitude scaling reciprocity $A_1$ for the first transceiver 10 and the reference amplitude scaling reciprocity $A_2$ for the second transceiver 20. As those skilled in the art would appreciate, the difference between the reference amplitude scaling reciprocity $A_1$ for the first transceiver 10 and the reference amplitude scaling reciprocity $A_2$ for the second transceiver 20 can be calculated as the ratio between the reference amplitude scaling reciprocity $A_1$ for the first transceiver 10 and the reference amplitude scaling reciprocity $A_2$ for the second transceiver 20, although the present disclosure is not limited in this regard and various forms of difference can be adopted.

In an embodiment, a pair of a calibration transmission chain $11_c$ and a calibration reception chain $12_c$ in the first transceiver 10 or a pair of a calibration transmission chain $21_c$ and a calibration reception chain $22_c$ in the second transceiver 20 may be used for determining the reference phase rotation reciprocity $P_1$ and the reference amplitude scaling reciprocity $A_1$ for the first transceiver 10 as well as the reference phase rotation reciprocity $P_2$ and the reference amplitude scaling reciprocity $A_2$ for the second transceiver 20.

Figure 15:
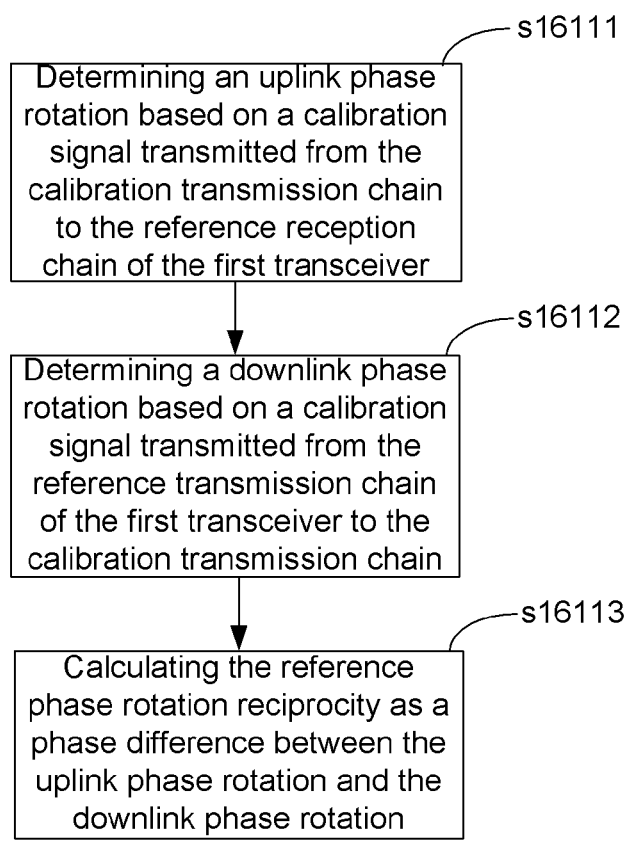

In that case, the operation shown at block s1611 in FIG. 14 may comprise operations shown at blocks s16111, s16112 and s16113 in FIG. 15. At block s16111, an uplink phase rotation $\epsilon_d+\partial_{1,u}+S_1$ for the first transceiver 10 is determined based on a calibration signal transmitted from the calibration transmission chain to the reference reception chain $12_1$ of the first transceiver 10.

The symbols $\epsilon_d$, $\partial_{1,u}$ and $S_1$ as used herein stand for the phase rotations introduced by the calibration transmission chain, the reference reception chain $12_1$ and a propagation path between the calibration transmission chain and the reference reception chain $12_1$, respectively.

Figure 17:
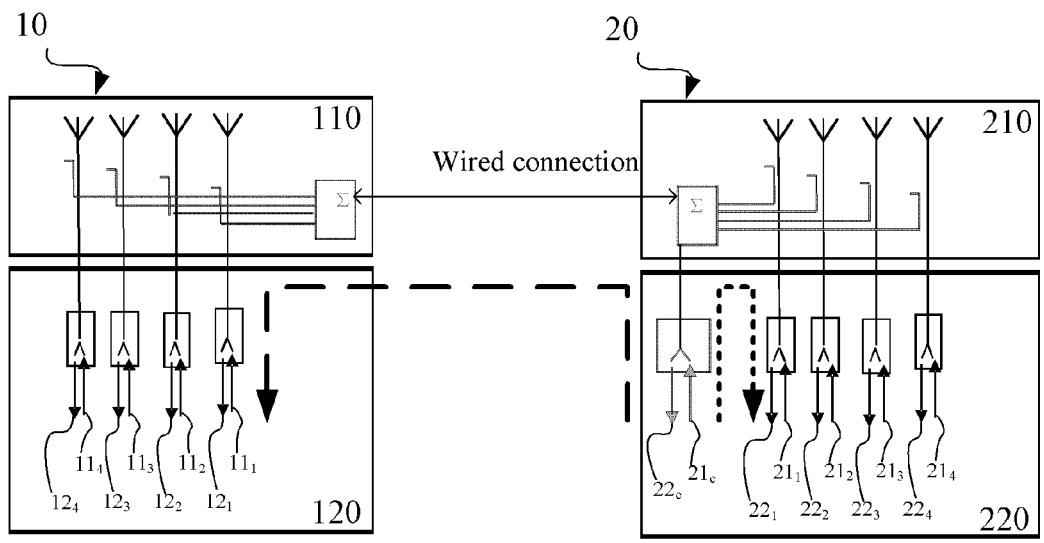
FIG. 17 is a diagram illustrating transmission of calibration signals between the two transceivers and within one of the transceivers for determining uplink phase rotations and amplitude scaling factors.

For illustrative purpose, FIG. 17 presents an example scenario where the transceivers 10 and 20 are connected in a wired manner and the calibration transmission chain $21_c$ in the second transceiver 20 is used for determining the uplink phase rotation $\epsilon_d+\partial_{1,u}+S_1$ for the first transceiver 10, with a dashed line denoting the transmission of the calibration signal from the calibration transmission chain $21_c$ to the reference reception chain $12_1$. Additionally, in FIG. 17, a dotted line is drawn to denote the transmission of a calibration signal from the calibration transmission chain $21_c$ to the reference reception chain $22_1$ of the second transceiver 20 for determining the uplink phase rotation for the second transceiver 20.

At block s16112, a downlink phase rotation $\partial_{1,d}+\epsilon_u+S_1$ is determined based on a calibration signal transmitted from the reference transmission chain $11_1$ of the first transceiver 10 to the calibration reception chain $22_c$. The symbols $\partial_{1,d}$, $\epsilon_u$ and $S_1$ as used herein stand for the phase rotations introduced by the reference transmission chain $11_1$, the calibration reception chain $22_c$ and the propagation path between the reference transmission chain $11_1$ and the calibration reception chain $22_c$, respectively.

Figure 18:
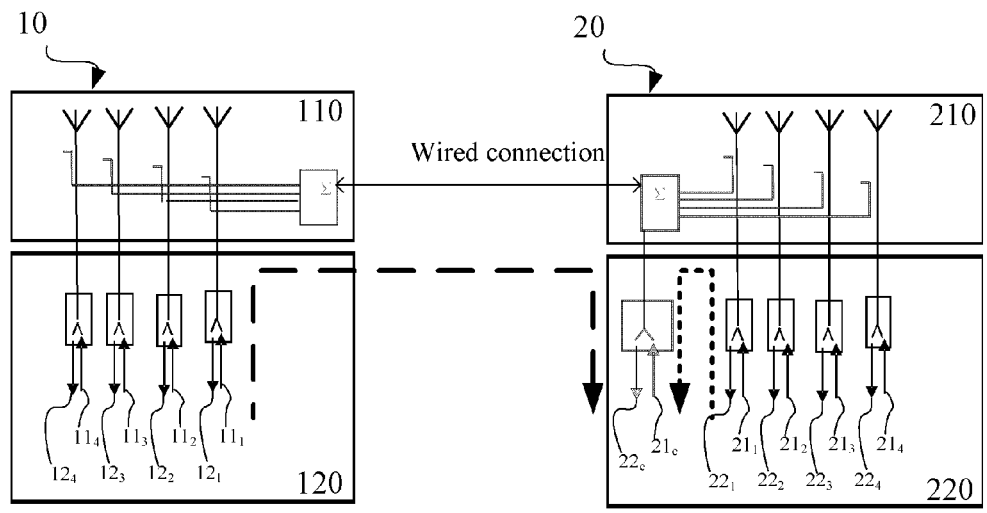
FIG. 18 is a diagram illustrating transmission of calibration signals between the two transceivers and within one of the transceivers for determining downlink phase rotations and amplitude scaling factors.

For illustrative purpose, FIG. 18 presents an example scenario where the transceivers 10 and 20 are connected in a wired manner and the calibration reception chain $22_c$ in the second transceiver 20 is used for determining the downlink phase rotation, with a dashed line denoting the transmission of the calibration signal from the reference transmission chain $11_1$ to the calibration reception chain $22_c$. Additionally, in FIG. 18, a dotted line is drawn to denote the transmission of a calibration signal from the reference transmission chain $21_1$ to the calibration reception chain $22_c$ for determining the downlink phase rotation for the second transceiver 20.

At block s16113, the reference phase rotation reciprocity is calculated as a phase difference $(\partial_{1,d}-\partial_{1,u})+(\epsilon_u-\epsilon_d)$ between the uplink phase rotation $\epsilon_d+\partial_{1,u}+S_1$ and the downlink phase rotation $\partial_{1,d}+\epsilon_u+S_1$.

Figure 16:
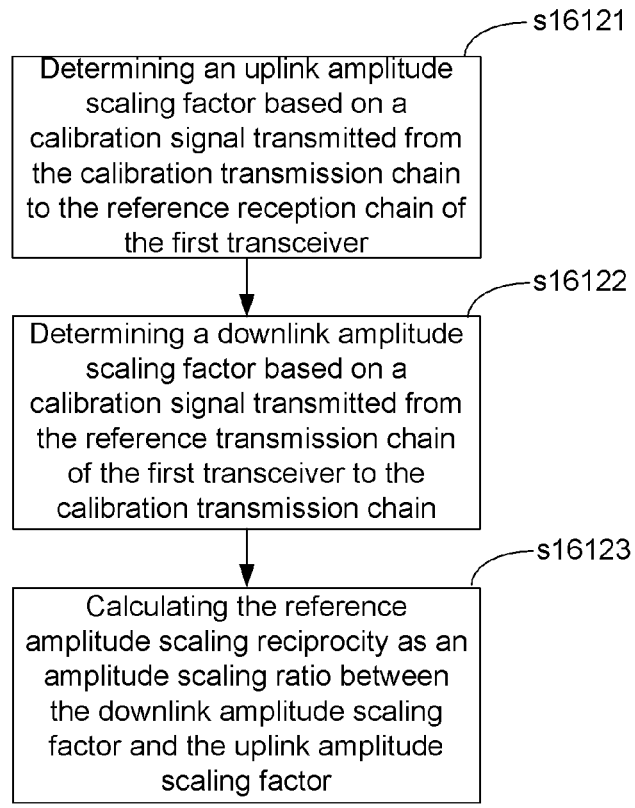

Likewise, the operation shown at block s1612 in FIG. 14 may comprise operations shown at blocks s16121, s16122 and s16123 as shown in FIG. 16. At block s16121, an uplink amplitude scaling factor $\gamma_d*\alpha_{1,u}*\beta_1$ is determined based on a calibration signal transmitted from the calibration transmission chain to the reference reception chain $12_1$ of the first transceiver 10. The symbols $\gamma_d$, $\alpha_{1,u}$ and $\beta_1$ as used herein stand for the amplitude scaling factors introduced by the calibration transmission chain, the reference reception chain $12_1$ and a propagation path between the calibration transmission chain and the reference reception chain $12_1$, respectively.

In an example scenario where the transceivers 10 and 20 are connected in a wired manner and the calibration transmission chain $21_c$ in the second transceiver 20 is used for determining the uplink amplitude scaling factor, the transmission of the calibration signal from the calibration transmission chain $21_c$ to the reference reception chain $12_1$ can also be denoted by the dashed line in FIG. 17. Additionally, the dotted line in FIG. 17 can also denote the transmission of a calibration signal from the calibration transmission chain $21_c$ to the reference reception chain $22_1$ of the second transceiver 20 for determining the uplink amplitude scaling factor for the second transceiver 20.

At block s16122, a downlink amplitude scaling factor $\alpha_{1,d}*\gamma_u*\beta_1$ is determined based on a calibration signal transmitted from the reference transmission chain $11_1$ of the first transceiver 10 to the calibration reception chain. The symbols $\alpha_{1,d}$, $\gamma_u$ and $\beta_1$ as used herein stand for the amplitude scaling factors introduced by the reference transmission chain $11_1$, the calibration reception chain and the propagation path between the reference transmission chain $11_1$ and the calibration reception chain, respectively.

In an example scenario where the transceivers 10 and 20 are connected in a wired manner and the calibration reception chain $22_c$ in the second transceiver 20 is used for determining the downlink amplitude scaling factor, the transmission of the calibration signal from the reference transmission chain $11_1$ to the calibration reception chain $22_c$ can also be denoted by the dashed line in FIG. 18. Additionally, the dotted line in FIG. 18 can also denote the transmission of a calibration signal from the reference transmission chain 211 to the calibration reception chain $22_c$ for determining the downlink amplitude scaling factor for the second transceiver 20.

At block s16123, the reference amplitude scaling reciprocity is calculated as an amplitude scaling ratio $(\alpha_{1,d}/\alpha_{1,u})*(\gamma_u/\gamma_d)$ between the downlink amplitude scaling factor $\alpha_{1,d}*\gamma_u*\beta_1$ and the uplink amplitude scaling factor $\gamma_d*\alpha_{1,u}*\beta_1$.

As already illustrated in FIGS. 12, 17 and 18, in a case where the two transceivers 10 and 20 are communicatively connected with each other via a wired connection, the transmission chains $11_1, \ldots, 11_4$ and $21_1, \ldots, 21_4$ of both the first transceiver 10 and the second transceiver 20 may be coupled to the calibration reception chain $22_c$ via a combiner, which may be inside either of the transceivers 10 and 20. The reception chains $12_1, \ldots, 12_4$ and $22_1, \ldots, 22_4$ of both the first transceiver 10 and the second transceiver 20 are coupled to the calibration transmission chain $21_c$ via the combiner.

Figure 19:
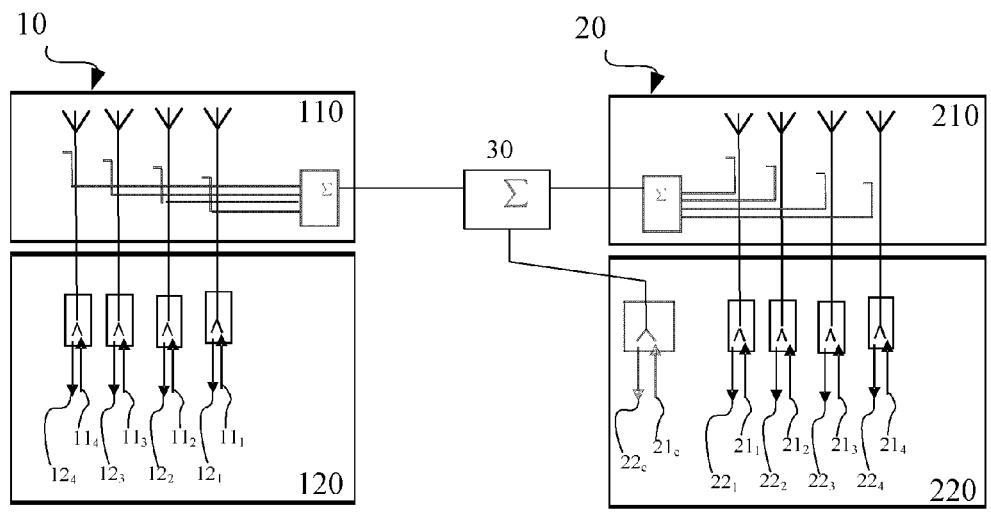
FIG. 19 is a diagram illustrating an alternative arrangement of two transceivers that can be used with the inter-transceiver antenna calibration method according to the second aspect of the disclosure.
Figure 20:
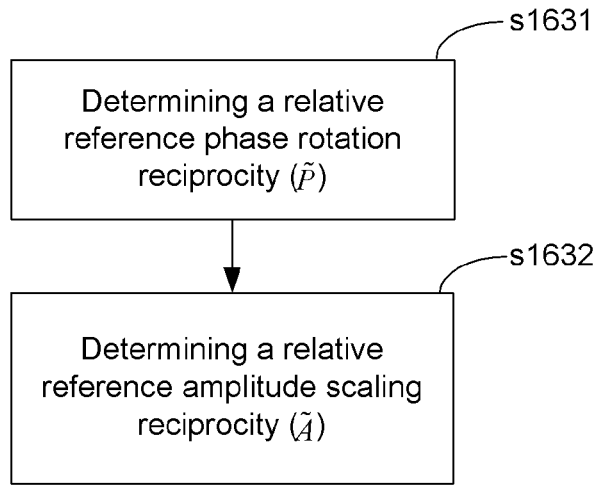

Alternatively, as illustrated in FIG. 19, the transmission chains $11_1, \ldots, 11_4$ and $21_1, \ldots, 21_4$ of both the first transceiver 10 and the second transceiver 20 may be coupled to the calibration reception chain $22_c$ via a combiner 30, which is outside both the transceivers 10 and 20. The reception chains $12_1, \ldots, 12_4$ and $22_1, \ldots, 22_4$ of both the first transceiver 10 and the second transceiver 20 are coupled to the calibration transmission chain $21_c$ via the combiner 30.

Figure 21:
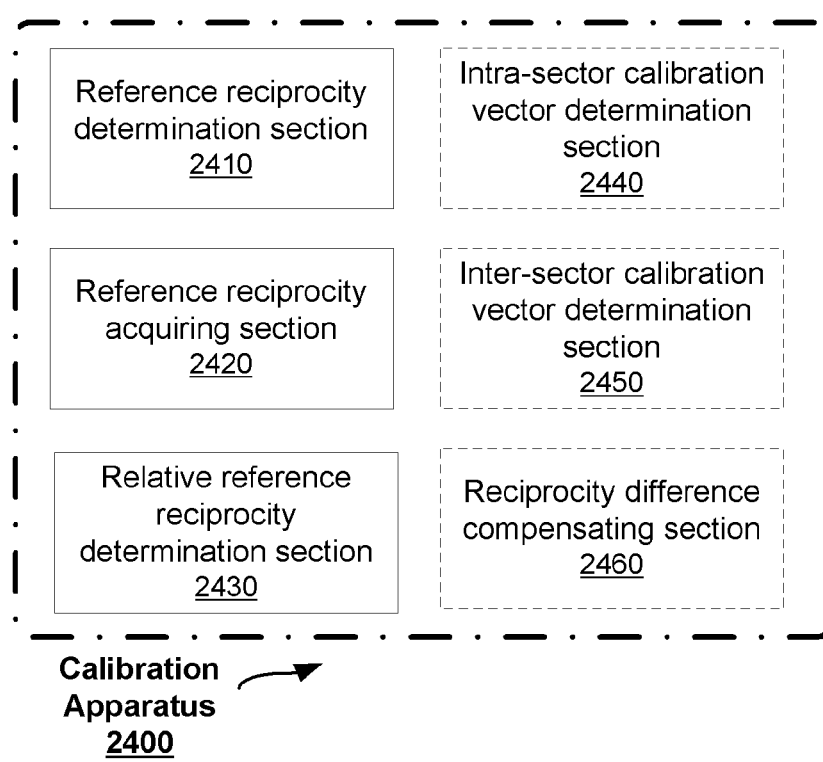
FIGS. 21-25 are block diagrams illustrating modules of an apparatus for inter-transceiver antenna calibration according to the second aspect of the disclosure.

FIG. 21 is a schematic block diagram of an apparatus 2400 in a base station for inter-transceiver antenna calibration of a first transceiver 10 of the base station with respect to a second transceiver 20 according to the second aspect of the disclosure.

As illustrated, the apparatus 2400 comprises a reference reciprocity determination section 2410, a reference reciprocity acquiring section 2420 and a relative reference reciprocity determination section 2430. The reference reciprocity determination section 2410 is configured to determine, for the first transceiver 10, a reference reciprocity $W_1$ between a pair of a reference transmission chain $11_1$ and a reference reception chain $12_1$ of the first transceiver 10 selected from one or more pairs of transmission chains $11_1, \ldots, 11_4$ and reception chains $12_1, \ldots, 12_4$ of the first transceiver 10. The reference reciprocity acquiring section 2420 is configured to acquire, from the second transceiver 20, a reference reciprocity $W_2$ between a pair of a reference transmission chain 211 and a reference reception chain $22_1$ of the second transceiver 20 selected from one or more pairs of transmission chains $21_1, \ldots, 21_4$ and reception chains $22_1, \ldots, 22_4$ of the second transceiver 20. The relative reference reciprocity determination section 2430 is configured to determine, based on the reference reciprocities $W_1$ and $W_2$ for the first and the second transceivers 10 and 20, a relative reference reciprocity $\tilde{W}$ between the pair of the reference transmission chain $11_1$ and the reference reception chain $12_1$ of the first transceiver 10 and the pair of the reference transmission chain $21_1$ and the reference reception chain $22_1$ of the second transceiver 20 for reference antenna reciprocity calibration of the first transceiver with respect to the second transceiver.

In an embodiment, the apparatus 2400 may further comprise an intra-transceiver calibration vector determination section 2440, an inter-transceiver calibration vector determination section 2450 and a reciprocity difference compensating section 2460. The intra-transceiver calibration vector determination section 2440 may be configured to determine, for the first transceiver 10, an intra-transceiver calibration vector $\vec{w}_{10}$ for compensating reciprocity differences between the pair of the reference transmission chain $11_1$ and the reference reception chain $12_1$ of the first transceiver 10 and each pair of transmission chains $11_1, \ldots, 11_4$ and reception chains $12_1, \ldots, 12_4$ of the first transceiver 10. The inter-transceiver calibration vector determination section 2450 may be configured to determine, for the first transceiver 10, an inter-transceiver calibration vector $\vec{w}'_{10}$ as the intra-transceiver calibration vector $\vec{w}_{10}$ for the first transceiver 10 adjusted by the relative reference reciprocity $\tilde{W}$. The reciprocity difference compensating section 2460 may be configured to apply the inter-transceiver calibration vector $\vec{w}'_{10}$ for the first transceiver 10 to all pairs of transmission chains $11_1, \ldots, 11_4$ and reception chains $12_1, \ldots, 12_4$ of the first transceiver 10.

In an embodiment, the reference reciprocity $W_1$ may comprise a reference phase rotation reciprocity $P_1$ and a reference amplitude scaling reciprocity $A_1$.

Figure 22:
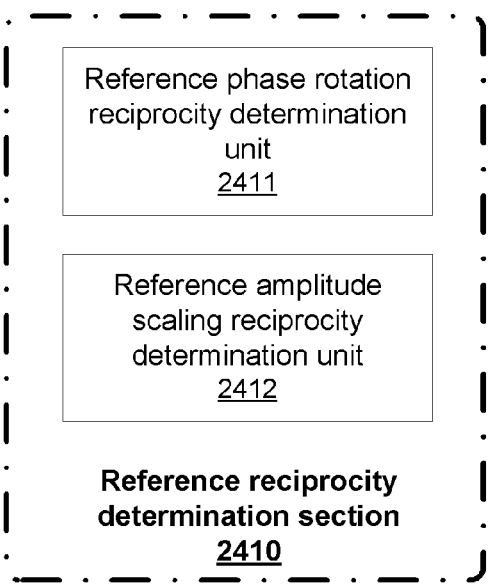

Accordingly, the reference reciprocity determination section 2410 may comprise a reference phase rotation reciprocity determination unit 2411 and a reference amplitude scaling reciprocity determination unit 2412 as illustrated in FIG. 22. The reference phase rotation reciprocity determination unit 2411 may be configured to determine, for the first transceiver 10, the reference phase rotation reciprocity $P_1$. The reference amplitude scaling reciprocity determination unit 2412 may be configured to determine, for the first transceiver 10, the reference amplitude scaling reciprocity $A_1$.

Figure 25:
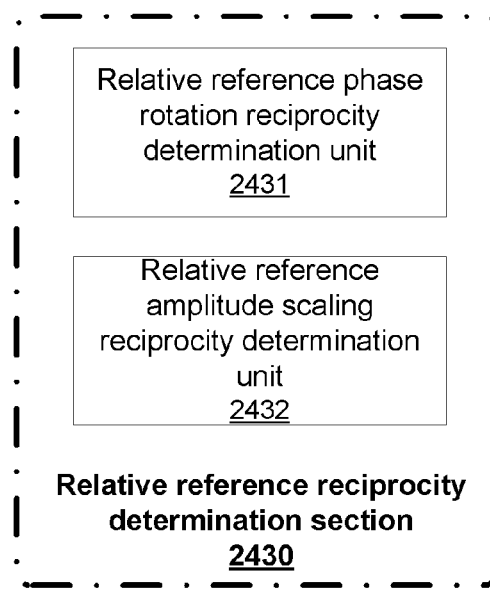

In an embodiment, the relative reference reciprocity $\tilde{W}$ may comprise a relative reference phase rotation reciprocity $\tilde{P}$ and a relative reference amplitude scaling reciprocity $\tilde{A}$. Accordingly, the relative reference reciprocity determination section 2430 may comprise a relative reference phase rotation reciprocity determination unit 2431 and a relative reference amplitude scaling reciprocity determination unit 2432 as illustrated in FIG. 25. The relative reference phase rotation reciprocity determination unit 2431 may be configured to determine the relative reference phase rotation reciprocity $\tilde{P}$ as a difference between the reference phase rotation reciprocity $P_1$ for the first transceiver 10 and the reference phase rotation reciprocity $P_2$ for the second transceiver 20. The relative reference amplitude scaling reciprocity determination unit 2432 may be configured to determine the relative reference amplitude scaling reciprocity $\tilde{A}$ as a difference between the reference amplitude scaling reciprocity $A_1$ for the first transceiver 10 and the reference amplitude scaling reciprocity $A_2$ for the second transceiver 20.

Figure 23:
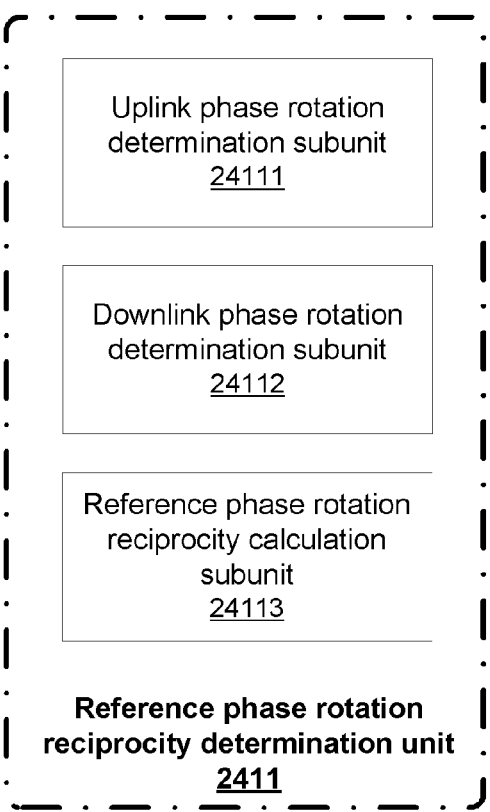
Figure 24:
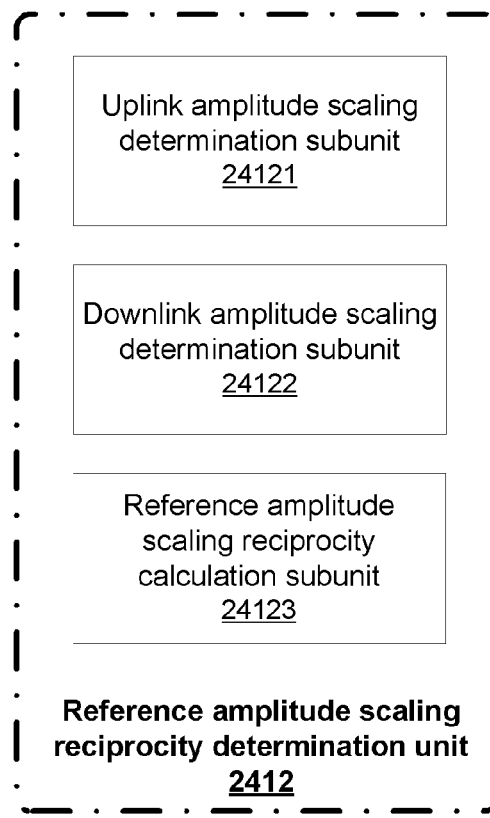

In an embodiment, one of the first and the second transceivers 10 and 20 may further comprise a calibration transmission chain $21_c$ and a calibration reception chain $22_c$, the reference phase rotation reciprocity determination unit 2411 may comprise an uplink phase rotation determination subunit 24111, a downlink phase rotation determination subunit 24112 and a reference phase rotation reciprocity calculation subunit 24113 as illustrated in FIG. 23, and the reference amplitude scaling reciprocity determination unit 2412 may comprise an uplink amplitude scaling determination subunit 24121, a downlink amplitude scaling determination subunit 24121 and a reference amplitude scaling reciprocity calculation subunit 24123 as illustrated in FIG. 24.

The uplink phase rotation determination subunit 24111 may be configured to determine an uplink phase rotation $\epsilon_d + \partial_{1,u} + S_1$ based on a calibration signal transmitted from the calibration transmission chain $21_c$ to the reference reception chain $12_1$ of the first transceiver 10. The downlink phase rotation determination subunit 24112 may be configured to determine a downlink phase rotation $\partial_{1,d} + \epsilon_u + S_1$ based on a calibration signal transmitted from the reference transmission chain $11_1$ of the first transceiver 10 to the calibration reception chain $22_c$. The reference phase rotation reciprocity calculation subunit 24113 may be configured to calculate the reference phase rotation reciprocity as a phase difference $(\partial_{1,d} - \partial_{1,u}) + (\epsilon_u - \epsilon_d)$ between the uplink phase rotation $\epsilon_d + \partial_{1,u} + S_1$ and the downlink phase rotation $\partial_{1,d} + \epsilon_u + S_1$.

The uplink amplitude scaling determination subunit 24121 may be configured to determine an uplink amplitude scaling factor $\gamma_d * \alpha_{1,u} * \beta_1$ based on a calibration signal transmitted from the calibration transmission chain $21_c$ to the reference reception chain $12_1$ of the first transceiver 10. The downlink amplitude scaling determination subunit 24121 may be configured to determine a downlink amplitude scaling factor $\alpha_{1,d}*\gamma_u*\beta_1$ based on a calibration signal transmitted from the reference transmission chain $11_1$ of the first transceiver 10 to the calibration reception chain $22_c$. The reference amplitude scaling reciprocity calculation subunit 24123 may be configured to calculate the reference amplitude scaling reciprocity as an amplitude scaling ratio $(\alpha_{1,d}/\alpha_{1,u})*(\gamma_u/\gamma_d)$ between the downlink amplitude scaling factor $\alpha_{1,d}*\gamma_u*\beta_1$ and the uplink amplitude scaling factor $\gamma_d*\alpha_{1,u}*\beta_1$.

In an embodiment, the transmission chains $11_1, \ldots, 11_4$ and $21_1, \ldots, 21_4$ of both the first transceiver 10 and the second transceiver 20 may be coupled, in a wired manner, to the calibration reception chain $22_c$. The reception chains $12_1, \ldots, 12_4$ and $22_1, \ldots, 22_4$ of both the first transceiver 10 and the second transceiver 20 may be coupled, in a wired manner, to the calibration transmission chain $21_c$.

In an embodiment, the transmission chains $11_1, \ldots, 11_4$ and $21_1, \ldots, 21_4$ of both the first transceiver 10 and the second transceiver 20 may be coupled to the calibration reception chain $22_c$ via a combiner. The reception chains $12_1, \ldots, 12_4$ and $22_1, \ldots, 22_4$ of both the first transceiver 10 and the second transceiver 20 may be coupled to the calibration transmission chain $21_c$ via the combiner.

As those skilled in the art will appreciate, the apparatus 1100 according to the first aspect of the disclosure and the apparatus 2400 according to the second aspect may be implemented using hardware circuitry, such as analog and/or discrete logic gates interconnected to perform a specialized function, Application Specific Integrated Circuits (ASICs), Programmable Logic Array (PLAs), etc. Alternatively, each of the apparatuses may be implemented using one or more digital microprocessors or general purpose computers. The apparatus 1100 or 2400 may be incorporated into a base station for antenna calibration of a first transceiver of the base station with respect to a second transceiver.

The present disclosure has been described above with reference to the embodiments thereof. However, those embodiments are provided just for illustrative purpose, rather than limiting the present disclosure. Therefore, the scope of the disclosure is defined by the attached claims as well as equivalents thereof. Those skilled in the art can make various alternations and modifications without departing from the scope of the disclosure, which all fall into the scope of the disclosure.

What is claimed is:

1. A method in a base station of a radio network for antenna calibration of a first transceiver of the base station with respect to a second transceiver, the method comprising:
   in a base station comprising a first transceiver and a second transceiver, each of the first and the second transceivers comprising one or more of a pair comprising a transmission chain and a reception chain and also comprising a pair of a calibration transmission chain and a calibration reception chain, performing at least one of:
   a first group of steps of
      collecting a first group of amplitude and phase differences between a first calibration signal and each of a first and a fourth reception signals and between a second calibration signal and each of a second and a third reception signals, wherein the first calibration signal is transmitted through one of the transmission chains of the first transceiver and received respectively through the calibration reception chain of the first transceiver and the calibration reception chain of the second transceiver as the first and the fourth reception signals and the second calibration signal is transmitted through one of the transmission chains of the second transceiver and received respectively through the calibration reception chains as the second and the third reception signals; and
      estimating, based on the first group of amplitude and phase differences, a signal response characteristic difference between the calibration reception chain of the first transceiver and the calibration reception chain of the second transceiver for reference antenna reception calibration of the first transceiver with respect to the second transceiver, and
   a second group of steps of
      collecting a second group of amplitude and phase differences between a third calibration signal and each of a fifth and a seventh reception signals and between a fourth calibration signal and each of a sixth and an eighth reception signals, wherein the third calibration signal is transmitted through the calibration transmission chain of the first transceiver and received respectively through one of the reception chains of the first transceiver and one of the reception chains of the second transceiver as the fifth and the seventh reception signals and the fourth calibration signal is transmitted through the calibration transmission chain of the second transceiver and received respectively through the one of the reception chains of the first transceiver and the one of the reception chains of the second transceiver as the sixth and the eighth reception signals; and
      estimating, based on the second group of amplitude and phase differences, a signal response characteristic difference between the calibration transmission chain of the first transceiver and the calibration transmission chain of the second transceiver for reference antenna transmission calibration of the first transceiver with respect to the second transceiver.

2. The method of claim 1, wherein the first group of steps further comprises:
   determining, for the first transceiver, an intra-transceiver reception calibration vector ($\vec{w}'_{10,r}$) for compensating signal response characteristic differences between each of the reception chains and the calibration reception chain of the first transceiver;
   determining, for the first transceiver, an inter-transceiver reception calibration vector ($\vec{w}'_{10,r}$) as the intra-transceiver reception calibration vector ($\vec{w}'_{10,r}$) for the first transceiver adjusted by the estimated difference between the calibration reception chain of the first transceiver and the calibration reception chain of the second transceiver; and
   applying the inter-transceiver reception calibration vector ($\vec{w}'_{10,r}$) for the first transceiver to all reception chains of the first transceiver, and
   wherein the second group of steps further comprises:
   determining, for the first transceiver, an intra-transceiver transmission calibration vector ($\vec{w}'_{10,r}$) for compensating signal response characteristic differences between each of the transmission chains and the calibration transmission chain of the first transceiver;

determining, for the first transceiver, an inter-transceiver transmission calibration vector ($\vec{w}'_{10,r}$) as the intra-transceiver transmission calibration vector ($\vec{w}'_{10,r}$) for the first transceiver adjusted by the estimated difference between the calibration transmission chain of the first transceiver and the calibration transmission chain of the second transceiver; and applying the inter-transceiver transmission calibration vector ($\vec{w}'_{10,r}$) for the first transceiver to all transmission chains of the first transceiver.

3. The method of claim 1, wherein a total number N of subcarriers are used for wireless communications in the radio network and the first to the fourth calibration signals are transmitted on each subcarrier k in a subset of the N subcarriers, and wherein the estimating the signal response characteristic difference between the calibration reception chain of the first transceiver and the calibration reception chain of the second transceiver comprises:

estimating, for each subcarrier k, a calibration reception chain amplitude scaling difference ($\gamma_{r,k}$) between the calibration reception chain of the first transceiver and the calibration reception chain of the second transceiver; and estimating a calibration reception chain delay difference ($\Delta_{t,r}$) and a calibration reception chain initial phase difference ($\phi_{ini,r}$) between the calibration reception chain of the first transceiver and the calibration reception chain of the second transceiver, and wherein the estimating the signal response characteristic difference between the calibration transmission chain of the first transceiver and the calibration transmission chain of the second transceiver comprises:

estimating, for each subcarrier k, a calibration transmission chain amplitude scaling difference ($\gamma_{t,k}$) between the calibration transmission chain of the first transceiver and the calibration transmission chain of the second transceiver; and estimating a calibration transmission chain delay difference ($\Delta_{t,t}$) and a calibration transmission chain initial phase difference ($\phi_{ini,t}$) between the calibration transmission chain of the first transceiver and the calibration transmission chain of the second transceiver.

4. The method of claim 3, wherein for each subcarrier k, the calibration reception chain amplitude scaling difference ($\gamma_{r,k}$) is estimated as $$sqrt\left(\frac{\beta_1 \beta_3}{\beta_2 \beta_4}\right),$$

wherein $\beta_1$ is a first amplitude difference between the first calibration signal and the first reception signal, $\beta_2$ is a second amplitude difference between the second calibration signal and the second reception signal, $\beta_3$ is a third amplitude difference between the second calibration signal and the third reception signal, and $\beta_4$ is a fourth amplitude difference between the first calibration signal and the fourth reception signal, and wherein for each subcarrier k, the calibration transmission chain amplitude scaling difference ($\gamma_{t,k}$) is estimated as $$sqrt\left(\frac{\beta_5 \beta_7}{\beta_6 \beta_8}\right),$$

wherein $\beta_5$ is a fifth amplitude difference between the third calibration signal and the fifth reception signal, $\beta_6$ is a sixth amplitude difference between the fourth calibration signal and the sixth reception signal, $\beta_7$ is a seventh amplitude difference between the third calibration signal and the seventh reception signal, and $\beta_8$ is an eighth amplitude difference between the fourth calibration signal and the eighth reception signal.

5. The method of claim 3, wherein the estimating the calibration reception chain delay difference ($\Delta_{t,r}$) and the calibration reception chain initial phase difference ($\phi_{ini,r}$) comprises:

for each subcarrier k, determining a calibration reception chain phase rotation difference ($\phi_k$) between the calibration reception chain of the first transceiver and the calibration reception chain of the second transceiver as $\theta_4 - [\theta_3 + \theta_4 - (\theta_1 + \theta_2)]/2 - \theta_1$, wherein $\theta_1$ is a first phase difference between the first calibration signal and the first reception signal, $\theta_2$ is a second phase difference between the second calibration signal and the second reception signal, $\theta_3$ is a third phase difference between the second calibration signal and the third reception signal, and $\theta_4$ is a fourth phase difference between the first calibration signal and the fourth reception signal;

determining the calibration reception chain delay difference ($\Delta_{t,r}$) and the calibration reception chain initial phase difference ($\phi_{ini,r}$), based on the calibration reception chain phase rotation difference ($\phi_k$) between the calibration reception chain of the first transceiver and the calibration reception chain of the second transceiver, and wherein the estimating the calibration transmission chain delay difference ($\Delta_{t,t}$) and the calibration transmission chain initial phase difference ($\phi_{ini,t}$) comprises:

for each subcarrier k, determining a calibration transmission chain phase rotation difference ($\emptyset_k$) between the calibration transmission chain of the first transceiver and the calibration transmission chain of the second transceiver as $\theta_8 - [\theta_7 + \theta_8 - (\theta_5 + \theta_6)]/2 - \theta_5$, wherein $\theta_5$ is a fifth phase difference between the third calibration signal and the fifth reception signal, $\theta_6$ is a sixth phase difference between the fourth calibration signal and the sixth reception signal, $\theta_7$ is a seventh phase difference between the third calibration signal and the seventh reception signal, and $\theta_8$ is an eighth phase difference between the fourth calibration signal and the eighth reception signal; and determining the calibration transmission chain delay difference and the calibration transmission chain initial phase difference ($\phi_{ini,t}$), based on the calibration transmission chain phase rotation difference ($\emptyset_k$) between the calibration transmission chain of the first transceiver and the calibration transmission chain of the second transceiver.

6. The method of claim 5, wherein the calibration reception chain delay difference ($\Delta_{t,r}$) is determined as $$\frac{L \cdot \sum_{k \in K}(k \cdot \varphi_k) - \sum_{k \in K} \varphi_k \cdot \sum_{k \in K} k}{L \cdot \sum_{k \in K} k^2 - \left(\sum_{k \in K} k\right)^2} * \frac{N}{2\pi};$$

and
the calibration reception chain initial phase difference ($\phi_{ini,r}$) is determined as $$\frac{\sum_{k \in K}(k \cdot \varphi_k) \cdot \sum_{k \in K} k - \sum_{k \in K} \varphi_k \cdot \sum_{k \in K} k^2}{\left(\sum_{k \in K} k\right)^2 - L \cdot \sum_{k \in K} k^2},$$

and
wherein
the calibration transmission chain delay difference ($\Delta_{t,t}$) is determined as $$\frac{L \cdot \sum_{k \in K}(k \cdot \phi_k) - \sum_{k \in K} \phi_k \cdot \sum_{k \in K} k}{L \cdot \sum_{k \in K} k^2 - \left(\sum_{k \in K} k\right)^2} * \frac{N}{2\pi};$$

and
the calibration transmission chain initial phase difference ($\phi_{ini,t}$) is determined as $$\frac{\sum_{k \in K}(k \cdot \phi_k) \cdot \sum_{k \in K} k - \sum_{k \in K} \phi_k \cdot \sum_{k \in K} k^2}{\left(\sum_{k \in K} k\right)^2 - L \cdot \sum_{k \in K} k^2},$$

wherein K is a set of indexes of the subcarriers in the subset, and L is the number of subcarriers in the subset.

7. An apparatus of a base station in a radio network for antenna calibration of a first transceiver of the base station with respect to a second transceiver, the apparatus comprising:
a first transceiver and a second transceiver, each of the first and the second transceivers comprising one or more of a pair comprising a transmission chain and a reception chain and also comprising a pair of a calibration transmission chain and a calibration reception chain;
an amplitude and phase difference collecting section configured to perform at least one of the functions of
collecting a first group of amplitude and phase differences between a first calibration signal and each of a first and a fourth reception signals and between a second calibration signal and each of a second and a third reception signals, wherein the first calibration signal is transmitted through one of the transmission chains of the first transceiver and received respectively through the calibration reception chain of the first transceiver and the calibration reception chain of the second transceiver as the first and the fourth reception signals and the second calibration signal is transmitted through one of the transmission chains of the second transceiver and received respectively through the calibration reception chains as the second and the third reception signals; and
collecting a second group of amplitude and phase differences between a third calibration signal and each of a fifth and a seventh reception signals and between a fourth calibration signal and each of a sixth and an eighth reception signals, wherein the third calibration signal is transmitted through the calibration transmission chain of the first transceiver and received respectively through one of the reception chains of the first transceiver and one of the reception chains of the second transceiver as the fifth and the seventh reception signals and the fourth calibration signal is transmitted through the calibration transmission chain of the second transceiver and received respectively through the one of the reception chains of the first transceiver and the one of the reception chains of the second transceiver as the sixth and the eighth reception signals, and a signal response characteristic difference estimation section configured to perform at least one of the functions of
estimating, based on the first group of amplitude and phase differences, a signal response characteristic difference between the calibration reception chain of the first transceiver and the calibration reception chain of the second transceiver for reference antenna reception calibration of the first transceiver with respect to the second transceiver; and
estimating, based on the second group of amplitude and phase differences, a signal response characteristic difference between the calibration transmission chain of the first transceiver and the calibration transmission chain of the second transceiver for reference antenna transmission calibration of the first transceiver with respect to the second transceiver.

8. The apparatus of claim 7, wherein the apparatus further comprises:
an intra-transceiver calibration vector determination section configured to perform at least one of the functions of
determining, for the first transceiver, an intra-transceiver reception calibration vector ($\vec{w}_{10,r}$) for compensating signal response characteristic differences between each of the reception chains and the calibration reception chain of the first transceiver;
determining, for the first transceiver, an intra-transceiver transmission calibration vector ($\vec{w}_{10,t}$) for compensating signal response characteristic differences between each of the transmission chains and the calibration transmission chain of the first transceiver,
an inter-transceiver calibration vector determination section configured to perform at least one of the functions of
determining, for the first transceiver, an inter-transceiver reception calibration vector ($\vec{w}'_{10,r}$) as the intra-transceiver reception calibration vector ($\vec{w}_{10,r}$) for the first transceiver adjusted by the estimated difference between the calibration reception chain of the first transceiver and the calibration reception chain of the second transceiver; and
determining, for the first transceiver, an inter-transceiver transmission calibration vector ($\vec{w}'_{10,t}$) as the intra-transceiver transmission calibration vector ($\vec{w}_{10,t}$) for the first transceiver adjusted by the estimated difference between the calibration transmission chain of the first transceiver and the calibration transmission chain of the second transceiver, and a compensation section configured to perform at least one of the functions of applying the inter-transceiver reception calibration vector ($\vec{w}'_{10,r}$) for the first transceiver to all reception chains of the first transceiver; and applying the inter-transceiver transmission calibration vector ($\vec{w}'_{10,t}$) for the first transceiver to all transmission chains of the first transceiver.

9. The apparatus of claim 7, wherein a total number N of subcarriers are used for wireless communications in the radio network and a subset of the N subcarriers are used to transmit the first to the fourth calibration signals, and wherein the signal response characteristic difference estimation section comprises:

a calibration chain amplitude scaling difference estimation unit configured to perform at least one of the functions of estimating, for each subcarrier k in the subset, a calibration reception chain amplitude scaling difference ($\gamma_{r,k}$) between the calibration reception chain of the first transceiver and the calibration reception chain of the second transceiver; and estimating, for each subcarrier k in the subset, a calibration transmission chain amplitude scaling difference($\gamma_{t,k}$) between the calibration transmission chain of the first transceiver and the calibration transmission chain of the second transceiver, and a calibration chain delay and initial phase difference estimation unit configured to perform at least one of the functions of estimating a calibration reception chain delay difference ($\Delta t_r$) and a calibration reception chain initial phase difference ($\phi_{ini,r}$) between the calibration reception chain of the first transceiver and the calibration reception chain of the second transceiver; and estimating a calibration transmission chain delay difference ($\Delta t_t$) and a calibration transmission chain initial phase difference ($\phi_{ini,t}$) between the calibration transmission chain of the first transceiver and the calibration transmission chain of the second transceiver.

10. The apparatus of claim 9, wherein the calibration chain amplitude scaling difference estimation unit is configured to perform at least one of the functions of for each subcarrier k in the subset, estimating the calibration reception chain amplitude scaling difference ($\gamma_{r,k}$) as $$sqrt\left(\frac{\beta_1 \beta_3}{\beta_2 \beta_4}\right),$$

wherein $\beta_1$ is a first amplitude difference between the first calibration signal and the first reception signal, $\beta_2$ is a second amplitude difference between the second calibration signal and the second reception signal, $\beta_3$ is a third amplitude difference between the second calibration signal and the third reception signal, and $\beta_4$ is a fourth amplitude difference between the first calibration signal and the fourth reception signal, and for each subcarrier k in the subset, estimating the calibration transmission chain amplitude scaling difference ($\gamma_{t,k}$) as $$sqrt\left(\frac{\beta_5 \beta_7}{\beta_6 \beta_8}\right),$$

wherein $\beta_5$ is a fifth amplitude difference between the third calibration signal and the fifth reception signal, $\beta_6$ is a sixth amplitude difference between the fourth calibration signal and the sixth reception signal, $\beta_7$ is a seventh amplitude difference between the third calibration signal and the seventh reception signal, and $\beta_8$ is an eighth amplitude difference between the fourth calibration signal and the eighth reception signal.

11. The apparatus of claim 9, the calibration chain delay and initial phase difference estimation unit comprises:

a calibration chain phase rotation difference determination subunit configured to perform at least one of the functions of for each subcarrier k in the subset, determining a calibration reception chain phase rotation difference ($\phi_k$) between the calibration reception chain of the first transceiver and the calibration reception chain of the second transceiver as $\theta_4-[\theta_3+\theta_4-(\theta_1+\theta_2)]/2-\theta_1$, wherein $\theta_1$ is a first phase difference between the first calibration signal and the first reception signal, $\theta_2$ is a second phase difference between the second calibration signal and the second reception signal, $\theta_3$ is a third phase difference between the second calibration signal and the third reception signal, and $\theta_4$ is a fourth phase difference between the first calibration signal and the fourth reception signal; and for each subcarrier k in the subset, determining a calibration transmission chain phase rotation difference ($\emptyset_k$) between the calibration transmission chain of the first transceiver and the calibration transmission chain of the second transceiver as $\theta_8-[\theta_7+\theta_8-(\theta_5+\theta_6)]/2-\theta_5$, wherein $\theta_5$ is a fifth phase difference between the third calibration signal and the fifth reception signal, $\theta_6$ is a sixth phase difference between the fourth calibration signal and the sixth reception signal, $\theta_7$ is a seventh phase difference between the third calibration signal and the seventh reception signal, and $\theta_8$ is an eighth phase difference between the fourth calibration signal and the eighth reception signal, and a calibration chain delay and initial phase difference determination subunit configured to perform at least one of the functions of determining the calibration reception chain delay difference ($\Delta_{t,r}$) and the calibration reception chain initial phase difference ($\phi_{ini,A}$), based on the calibration reception chain phase rotation difference ($\phi_k$) between the calibration reception chain of the first transceiver and the calibration reception chain of the second transceiver; and determining the calibration transmission chain delay difference ($\Delta_{t,t}$) and the calibration transmission chain initial phase difference ($\phi_{ini,t}$), based on the calibration transmission chain phase rotation difference ($\emptyset_k$) between the calibration transmission chain of the first transceiver and the calibration transmission chain of the second transceiver.

12. The apparatus of claim 11, wherein the calibration chain delay and initial phase difference determination subunit is configured to perform at least one of the functions of determining the calibration reception chain delay difference ($\Delta_{t,r}$) as $$\frac{L \cdot \sum_{k \in K}(k \cdot \varphi_k) - \sum_{k \in K} \varphi_k \cdot \sum_{k \in K} k}{L \cdot \sum_{k \in K} k^2 - \left(\sum_{k \in K} k\right)^2} * \frac{N}{2\pi}$$

and determining the calibration reception chain initial phase difference ($\phi_{ini,r}$) as $$\frac{\sum_{k \in K}(k \cdot \varphi_k) \cdot \sum_{k \in K} k - \sum_{k \in K} \varphi_k \cdot \sum_{k \in K} k^2}{\left(\sum_{k \in K} k\right)^2 - L \cdot \sum_{k \in K} k^2},$$

and
determining the calibration transmission chain delay difference ($\Delta_{t,t}$) as $$\frac{L \cdot \sum_{k \in K}(k \cdot \phi_k) - \sum_{k \in K} \phi_k \cdot \sum_{k \in K} k}{L \cdot \sum_{k \in K} k^2 - \left(\sum_{k \in K} k\right)^2} * \frac{N}{2\pi}$$

and determining the calibration transmission chain initial phase difference ($\phi_{ini,t}$) as $$\frac{\sum_{k \in K}(k \cdot \phi_k) \cdot \sum_{k \in K} k - \sum_{k \in K} \phi_k \cdot \sum_{k \in K} k^2}{\left(\sum_{k \in K} k\right)^2 - L \cdot \sum_{k \in K} k^2},$$

wherein K is set of indexes of the subcarriers in the subset, and L is the number of subcarriers in the subset.

* * * * *